US008682323B2

(12) United States Patent
Dei et al.

(10) Patent No.: US 8,682,323 B2
(45) Date of Patent: Mar. 25, 2014

(54) CELLULAR PHONE SYSTEM, CELLULAR PHONE TERMINAL, PRIVATE INFORMATION PROTECTION METHOD, PRIVATE INFORMATION PROTECTION PROGRAM AND PROGRAM RECORDED MEDIUM

(75) Inventors: Hiroaki Dei, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1656 days.

(21) Appl. No.: 11/752,027

(22) Filed: May 22, 2007

(65) Prior Publication Data

US 2007/0275720 A1 Nov. 29, 2007

(30) Foreign Application Priority Data

May 23, 2006 (JP) .................................. 2006-143115

(51) Int. Cl.
*H04W 4/00* (2009.01)
(52) U.S. Cl.
USPC ..................... 455/435.2; 455/41.2; 455/414.1; 455/552.1; 370/338
(58) Field of Classification Search
USPC ............ 455/426.1, 435.2, 41.2, 550.1, 556.2, 455/412.1–414.4; 370/328, 338
See application file for complete search history.

(56) References Cited

U.S. PATENT DOCUMENTS

| | | | | |
|---|---|---|---|---|
| 5,895,471 | A * | 4/1999 | King et al. .............................. | 1/1 |
| 6,243,739 | B1 * | 6/2001 | Schwartz et al. ............. | 709/206 |
| 6,421,536 | B1 * | 7/2002 | Uranaka et al. ............... | 455/417 |
| 6,577,849 | B1 * | 6/2003 | Eaton et al. ................... | 455/3.01 |
| 7,054,634 | B2 * | 5/2006 | Watanabe et al. ............. | 455/440 |
| 7,412,224 | B2 * | 8/2008 | Kotola et al. .................. | 455/403 |
| 7,664,244 | B2 * | 2/2010 | Bedingfield ............. | 379/201.11 |
| 7,773,989 | B2 * | 8/2010 | Tobe et al. ................. | 455/435.2 |
| 7,849,102 | B2 * | 12/2010 | Murillo et al. ................ | 707/783 |
| 2002/0023024 | A1 * | 2/2002 | Kaimowitz ..................... | 705/26 |

(Continued)

FOREIGN PATENT DOCUMENTS

| | | |
|---|---|---|
| JP | 11-234760 A | 8/1999 |
| JP | 2004-040595 A | 2/2004 |
| JP | 2006-014008 A | 1/2006 |

OTHER PUBLICATIONS

Handley, M., Schulzrinne, H., Schooler, E., Rosenberg, J., "SIP: Session Initiation Protocol", RFC 2543, Mar. 1999.

(Continued)

*Primary Examiner* — Sharad Rampuria
(74) *Attorney, Agent, or Firm* — Dickstein Shapiro LLP

(57) ABSTRACT

A cellular phone terminal 103 can be connected to both of a wireless cellular phone base station 104 that is a public network and a wireless LAN access pint 101 that is a private wireless network to be used by particular users. When the cellular phone terminal 103 enters a wireless area 102 of the private wireless network, the cellular phone terminal 103 activates at least one part of at least one data processing functions of an address book function 103a, a bookmark function 103b and a mailbox function 103c that handle private information for the cellular phone terminal 103. On the other hand, when the cellular phone terminal 103 moves outside the wireless LAN area 102 like a cellular phone terminal 106, at least one part of the function of the activated functions is non-activated or disabled. The activated/non-activated functions are differentiated depending on a plurality of the private wireless networks or the user of the cellular phone terminal.

51 Claims, 9 Drawing Sheets

(56) References Cited

U.S. PATENT DOCUMENTS

| | | | |
|---|---|---|---|
| 2002/0075844 A1* | 6/2002 | Hagen | 370/351 |
| 2002/0128036 A1* | 9/2002 | Yach et al. | 455/552 |
| 2003/0165128 A1* | 9/2003 | Sisodia et al. | 370/338 |
| 2003/0220966 A1* | 11/2003 | Hepper et al. | 709/203 |
| 2004/0045027 A1 | 3/2004 | Takamura et al. | |
| 2004/0048624 A1* | 3/2004 | Ko et al. | 455/457 |
| 2004/0092266 A1* | 5/2004 | Olrik | 455/445 |
| 2004/0157589 A1* | 8/2004 | Watanabe et al. | 455/415 |
| 2005/0021638 A1* | 1/2005 | Caldini et al. | 709/206 |
| 2005/0047373 A1 | 3/2005 | Kojima | |
| 2005/0170813 A1* | 8/2005 | Choi | 455/411 |
| 2007/0223683 A1* | 9/2007 | Pearson | 379/355.01 |
| 2011/0086643 A1* | 4/2011 | Kalayjian et al. | 455/445 |

OTHER PUBLICATIONS

Fielding, R., Gettys, J., Mogul, J., Frystyk, H., Masinter, L., Leach, P., Berners-Lee, T, "Hypertext Transfer Protocol—HTTP/1.1", RFC 2616, Jun. 1999.

Berners-Lee, T., Connolly, D., "Hypertext Markup Language-2.0", RFC 1866, Nov. 1995.

Crispin, M., "Internet Message Access Protocol—Version 4 rev1", RFC 2060, Dec. 1996.

* cited by examiner

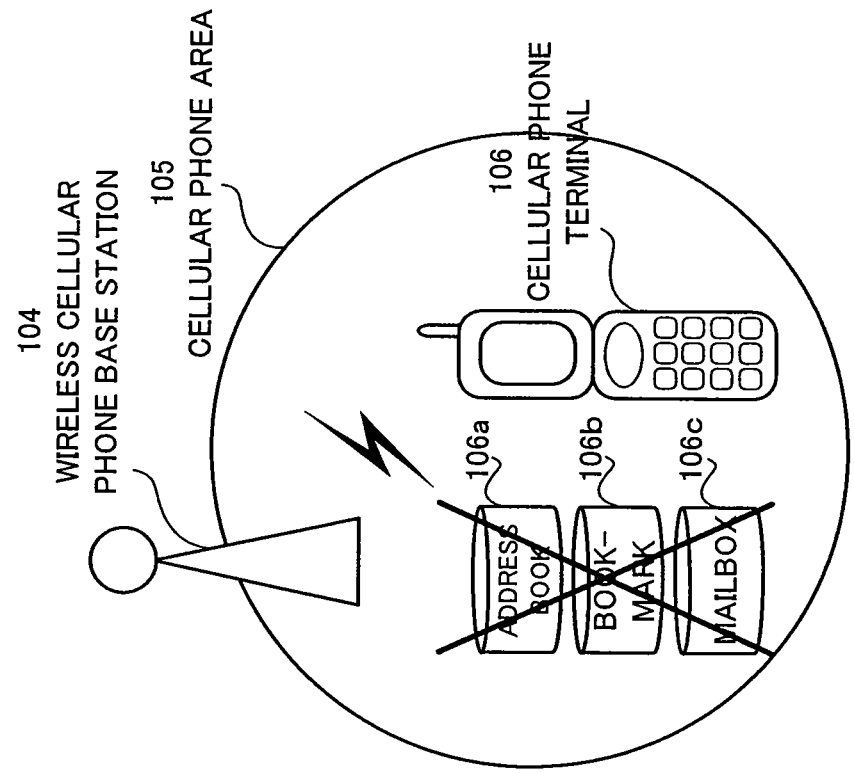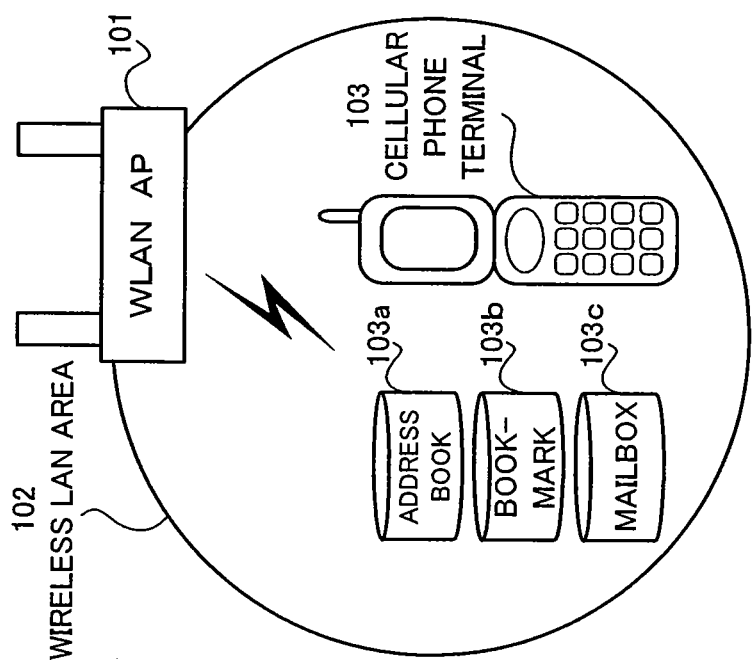

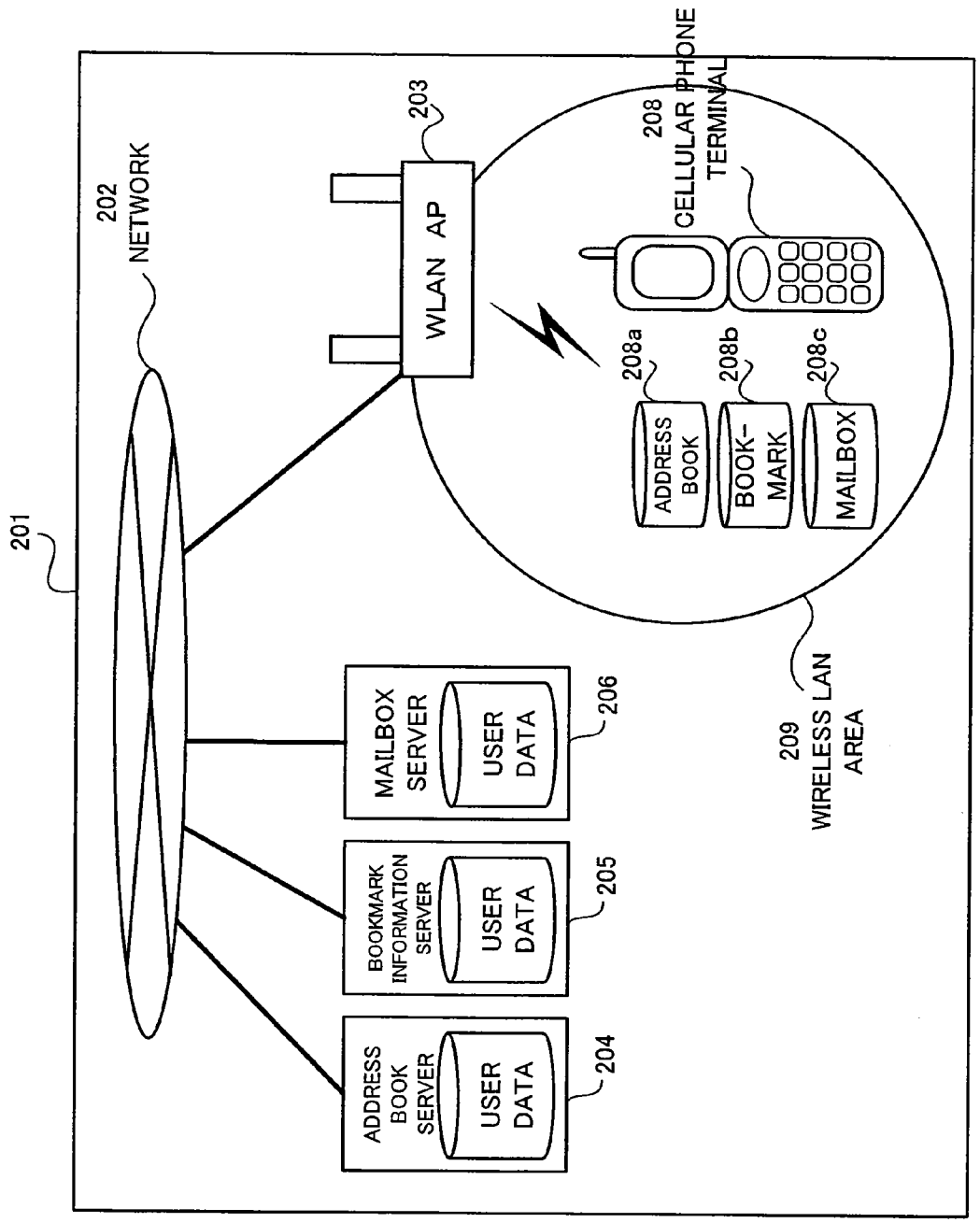

CELLULAR PHONE SYSTEM, CELLULAR PHONE TERMINAL, PRIVATE INFORMATION PROTECTION METHOD, PRIVATE INFORMATION PROTECTION PROGRAM AND PROGRAM RECORDED MEDIUM

BACKGROUND OF THE INVENTION

This application is based upon and claims the benefit of priority from Japanese patent application No. 2006-143115, filed on May 23, 2006, the disclosure of which is incorporated herein in its entirely by reference.

The present invention relates generally to a cellular phone system, a cellular phone terminal, a private information protection method, a private information protection program and a program recorded medium, more specifically to a cellular phone system, a cellular phone terminal, a private information protection method, a private information protection program and a program recorded medium for protecting private information stored in a cellular phone terminal.

Generally, a cellular phone terminal or a portable telephone terminal has an address book function in which the user is able to search the address book of the cellular phone terminal for simply dialing a desired telephone number or sending an electronic mail.

Also, a cellular phone terminal has a mail box function for saving electronic mail information of received electronic mails. Moreover, a cellular phone terminal that is capable of gaining access to internet web pages has a bookmark function to register web page URLs for enabling the user to easily gaining access to his/her favorite web pages as disclosed in the following non-patent documents 1 through 4:

Non-patent document 1: Handley, M., Schulzrinne, H., Schooler, E., Rosenberg, J., "SIP: Session Initiation Protocol", RFC 2543, March 1999

Non-patent document 2: Fielding, R., Gettys, J., Mogul, J., Frystyk, H., Masinter, L., Leach, P., Berners-Lee, T, "Hypertext Transfer Protocol-HTTP/1.1", RFC 2616, June 1999

Non-patent document 3: Berners-Lee, T., Connolly, D., "Hypertext Markup Language-2.0", RFC 1866, November 1995

Non-patent document 4: Crispin, M., "INTERNET MESSAGE ACCESS PROTOCOL-VERSION 4 rev1", RFC 2060, December 1996

However, registration numbers, telephone numbers, electronic mail addresses, bookmark information, electronic mail information and the likes included in the above-mentioned address, bookmark and mailbox functions are private information. In recent years, general public is increasing conscious to protection of private information and it is a social problem that such private information leaks when such cellular phone terminals are lost or stolen.

In order to avoid such problem, there are developed some cellular phone terminals to restrict accessing to the address book and the mail box or dialing by means of password. However, such technique is not sufficient countermeasure against leakage of private information in that considerable burdens are imposed to the user for setting a password or for manually switching to a security mode, which is sometimes failed by the user. Additionally, a cellular phone terminal does not have enough capacity for a password.

Moreover, since mobile centrex is gaining popularity in recent years, cellular phone terminals that can be used also as extensions by a wireless LAN in a company or the like are increasingly popular in a business field. Telephone numbers, mail address information and electronic mail information included in the address book function in such business use cellular phone terminals are clients' confidential information. As a result, the leakage of such confidential information causes immeasurable impact.

SUMMARY OF THE INVENTION

In consideration of the above circumstances, it is an object of the present invention to provide a cellular phone system, a cellular phone terminal, a private information protection method, a private information protection program and a program recording medium that are able to prevent leakage of private information in case when the cellular phone terminal is lost or stolen by providing means so that the address book function, the bookmark function or the mailbox function of the cellular phone terminal cannot be used by anyone other than the proper user of such cellular phone terminal.

It is another object of the present invention to provide the cellular phone system, the cellular phone terminal, the private information protection method, the private information protection program and the program recording medium that achieve the primary object with minimum burden to the user.

According to an exemplary aspect of the invention, there is provided a cellular phone terminal to be connected to both of a public wireless cellular phone network available to general public users and a private wireless network closed to be available to particular users, comprising: at least one data processing functions of an address book function, a bookmark function and a mailbox function; activation means for activating at least one part of the at least one data processing function of the data processing functions when the cellular phone terminal enters the wireless area of the private wireless network; and non-activation means for non-activating the at least one part of the function that is activated by the activation means when moving outside the wireless area of the private wireless network.

BRIEF DESCRIPTION OF THE DRAWINGS

For a more complete understanding of the present invention and the advantages thereof, reference is now made to the following description taken in connection with the accompanying drawings in which the reference numbers indicate like features as wherein:

FIG. 1 shows the system configuration of a first exemplary embodiment of the cellular phone system according to the present invention;

FIG. 2 shows the system configuration of a second exemplary embodiment of the cellular phone system according to the present invention;

DETAILED DESCRIPTION OF EXEMPLARY EMBODIMENTS

Figure 3:
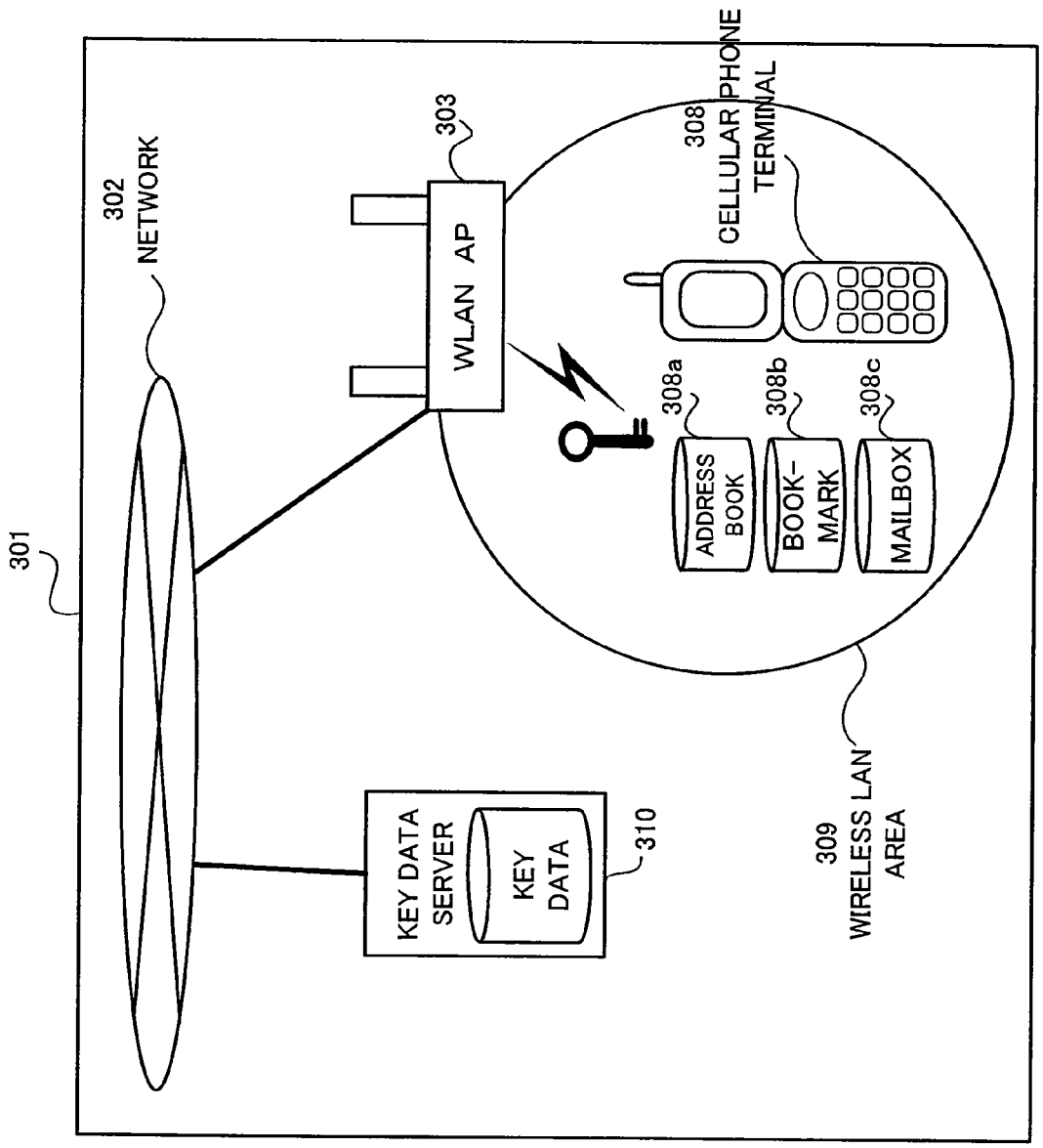
FIG. 3 shows the system configuration of a third exemplary embodiment of the cellular phone system according to the present invention.

Now, exemplary embodiments of the cellular phone system of the present invention will be described in detail with reference to the accompanying drawings.

FIG. 1 shows the system configuration of the first exemplary embodiment of the cellular phone system according to the present invention. In FIG. 1, FIG. 1 (A) shows an instance when a cellular phone terminal 103 is located within a particular area of the private wireless network known as a wireless LAN area 102 of a wireless LAN access point 101. On the other hand, FIG. 1 (B) shows an instance when a cellular phone terminal 106 is located outside the wireless LAN area 102 but within the wireless cell of a public cellular phone base station 104, that is, within the cellular phone area 105 of the public wireless cellular phone network. As shown in the system configuration in FIG. 1, the cellular phone system of this exemplary embodiment comprises a wireless LAN access point 101, cellular phone terminals 103, 106 and the wireless cellular phone base station 104.

Although the wireless LAN area 102 in FIG. 1 is described as the service area of the wireless LAN access point 101 that is installed in a company, it is not necessarily limited to the wireless LAN and may be any private wireless network that is installed, for example, in a company or the like.

Similarly, although the cellular phone terminals 103 and 106 are described in this particular exemplary embodiment to include three data processing functions that handle private information, i.e., address book functions 103a-106a, bookmark functions 103b-106b and mailbox functions 103c-106c, respectively, the present invention should not be limited to these three data processing functions but is effectively applied to any functions that handle private information.

Each of the cellular phone terminals 103 and 106 is a terminal that can be used in both of a public wireless cellular phone network that is usable in the cellular phone area 105 of the public wireless cellular phone base station 104 and the wireless LAN network that is usable in the wireless LAN area 102 of the wireless LAN access point 101. As shown in FIG. 1 (A), the cellular phone terminal 103 may be located in the particular area of the wireless LAN area 102 in, for example, a company for distinctive business use in the company. For this end, the cellular phone terminal 103 is set so that the three data processing functions of the address book function 103a, the bookmark function 103b and the mailbox function 103c are activated, thereby enabling the user of the cellular phone terminal 103 to use either one of the functions. Accordingly, the user is able to use, for example, the address book function 103a for conducting the search for any telephone number registered in the cellular phone terminal 103 and then calling the telephone number.

On the other hand, the cellular phone terminal 106 is at a remote location from the wireless LAN area 102 but within the public area of the cellular phone area 105 in which general public users can use their cellular phone terminals. At this instance, the cellular phone terminal 105 is set so that the three data processing functions of the address book function 106a, the bookmark function 106b and the mailbox function 106c are inactive and the user of the cellular phone terminal 106 is unable to use any one of the data processing functions. Accordingly, the user is unable to call any telephone number registered in, for example, the address book function 106a or reference to any telephone number in the address book function 106a.

If the cellular phone terminal 103 that was located within the wireless LAN area 102 moves outside the particular area of the wireless LAN area 102, all of the three data processing functions, i.e., the address book function 103a, the bookmark function 103b and mailbox function 103c that handle private information are non-activated or disabled so that the user can no longer use such functions. On the contrary, if the cellular phone terminal 106 that was located outside the wireless LAN area 102 enters the wireless LAN area 102, the three data processing functions handling the private information, i.e., the address book function 106a, the bookmark function 106b and the mailbox function 106c that were unable to be used are activated again so that the user can use such functions.

In general, as shown in the wireless LAN area 102 in FIG. 1, the wireless LAN area is set in a company or the like. Because of a restricted entry in the plant of a company or watching by security personnel or the like, it is not easy for unauthorized persons to enter the plant of a company and use any functions of their cellular phone terminals that handle private information. As a result, persons who use their cellular phone terminals in such wireless LAN area are most likely the users of the cellular phone terminals or other proper users who are permitted to use the cellular phone terminals.

On the contrary, if cellular phone terminals are, for example, lost or stolen and any persons other than their proper users may attempt to use them, it is possible to prevent leakage of private information because such persons are difficult to enter the wireless LAN area and handle private information using the functions of such lost or stolen cellular phone terminals.

In the particular exemplary embodiment, although each data processing function handling private information such as the address book function, the bookmark function and the mailbox function that are installed in the cellular phone terminal is described to be activated or disenabled (non-activated) depending on whether or not the cellular phone terminal is located in the wireless LAN area, it is possible to change the data processing functions so that activation/non-activation of the data processing functions is set by activation/non-activation means depending on the user of the cellular phone terminal. In other words, at least one of the data processing functions may be set to be activated by the activation means or disabled by the non-activation means depending on the user of the cellular phone terminal.

It is also possible to provide a plurality of wireless LAN areas so as to change the data processing functions to be restricted for each wireless LAN area, at least a part of the data processing functions to be restricted, or the information to be activated or non-activated, for example, in the address book for each wireless LAN area. In other words, at least one part of function of at least one of the data processing functions that are activated by the activation means or disabled by the non-activation means are changed depending on any one of the plurality of private wireless networks. For example, in case of application in a company, wireless LAN areas that can be entered are differentiated depending on the user's position in the company, the degree of protecting individual private information is controlled for each wireless LAN area in which the user enters.

The second exemplary embodiment is a cellular phone terminal provided with both connection means for connecting to a public wireless cellular phone network that can be used by general public users and for connecting to a private wireless network that particular users are permitted to use as a closed network, wherein the cellular phone terminal includes at least one of the following data processing functions (a) an address book function,
(b) a bookmark function, and
(c) a mailbox function as private information handling functions, and also a function for downloading information as stored in at least one server of (a) an address book server that stores address book information to be used in the address book function,
(b) a bookmark information server that stores bookmark information to be used in the bookmark function, and
(c) a mailbox server that stores electronic mail information to be used in the mailbox function that can be connected from the private wireless network.

In the second exemplary embodiment, when the cellular phone terminal enters the area of the private wireless network, at least one part of at least one of the three data processing functions is activated by the activation means included in the cellular phone terminal, information related to the users of the cellular phone terminal from at least one server of the three servers and/or at least one part of the information common to each user is downloaded and stored in the cellular phone terminal by the download means provided in the cellular phone terminal. On the other hand, when the cellular phone terminal exits outside the area of the private wireless network, at least one part of the information of the server that is downloaded and stored in the cellular phone terminal by the download means is deleted by deleting means provided in the cellular phone terminal and at least one part of the activated functions is disabled by non-activation means provided in the cellular phone terminal.

Now, this exemplary embodiment will be described in detail with reference to the drawings.

FIG. 2 shows the system configuration of the second embodiment of the cellular phone system according to the present invention. As shown in the system configuration in FIG. 2, this embodiment of the cellular phone system comprises a network 202, a wireless LAN access point (WLAN AP) 203, an address book server 204, a bookmark information server 205, a mailbox server 206 and a cellular phone terminal 208.

FIG. 2 shows the system configuration of the second exemplary embodiment of the cellular phone system. As shown in the system in FIG. 2, the cellular phone system in this particular embodiment comprises a network 202, a wireless LAN access point (WLAN AP) 203, an address book server 204, a bookmark information server 205, a mailbox server 206 and a cellular phone terminal 208.

It is described that a wireless LAN area 209 in FIG. 2 is the service area of the wireless LAN access point 203 that is installed in a company. However, it is to be noted that the present invention should not be limited only to a wireless LAN but may be any private wireless network.

Similarly, this exemplary embodiment is described that the cellular phone terminal 208 is provided with three data processing functions, i.e., an address book function 208a, a bookmark information function 208b and a mailbox function 208c as private information handling functions. However, it is to be noted that the present invention should not be limited to the particular functions including such three data processing functions but is effective to any functions that handle private information.

The cellular phone terminal 208 is a terminal that can be used in either one of the public wireless cellular phone network that is usable in the cellular phone area of the wireless cellular phone base station (not shown in FIG. 2) and the wireless LAN network that is usable in the wireless LAN area 209 of the wireless LAN access point 203 as shown in FIG. 2. As shown in FIG. 2, the cellular phone terminal 208 is located in a particular area of the wireless LAN area 209 installed, for example, in a company and is in the distinctive condition to be used for the business of the company.

In this instance, the cellular phone terminal 208 is set so that the three data processing functions, i.e., the address book function 208a, the bookmark function 208b and the mailbox function 208c are activated. Accordingly, the user of the cellular phone terminal 208 is able to connect to the address book server 204, the bookmark information server 205 and the mailbox server 206 by way of the wireless LAN access point 203 and the network 202 for downloading the user data (private information) of the cellular phone terminal 208 and/or data common to any users. The cellular phone terminal 208 is in the condition that the user is able to use the downloaded data. This means that as long as the cellular phone terminal 208 is in the wireless LAN area 209 the user is able to use, for example, the address book function 208a for conducting the search for any telephone number downloaded in the cellular phone terminal 208 from the address book server 204 and calling the telephone number.

On the other hand, in an instance when the cellular phone terminal 208 moves outside the wireless LAN area 209 of the wireless LAN access point 203, the user data that is downloaded from the address book server 204, the bookmark information server 205 and the mailbox server 206 is deleted and the three data processing functions handling private information, i.e., the address book function 208a, the bookmark function 208b and the mailbox function 208c that were usable in the wireless LAN area 209 are non-activated. Either one of the data processing functions is no longer available to the user of the cellular phone terminal 208. As a result, the user of the cellular phone terminal 208 is unable to, for example, call any telephone number that is downloaded in the address book function 208a from the address book server 204 or make reference to any telephone number, thereby preventing private information from leaking in the similar manner as in the first embodiment.

On the contrary, in an instance when the cellular phone terminal 208 that was outside the wireless LAN area 209 enters the wireless LAN area 209, the three data processing functions handling private information, i.e., the address book function, the bookmark function and the mailbox function that were not available are now activated. The cellular phone terminal 208 can be connected to the address book server 204, the bookmark information server 205 and the mailbox server 206 by way of the wireless LAN access point 203 and the network 202 for enabling the user of the cellular phone terminal 208 to download the respective user data (private information) and/or any data common to all users for subsequent use of the downloaded data.

Generally, as shown by an entry management area 201 in FIG. 2, the wireless LAN area 209 is installed in a company or the like where entry in its plant is restricted or watched by security personnel or the like. It is therefore difficult for anyone other than authorized users of the cellular phone terminal to enter the wireless LAN area 209 in such company and use the functions of the cellular phone terminal for downloading user data (private information) or the like on the user of the cellular phone terminal from the address book server 204, the bookmark information server 205 and the mailbox server 206 and use the user data 8private information). Accordingly, it is most likely that the person who uses the cellular phone terminal 208 in the wireless LAN area 209 is the proper user of the cellular phone terminal or authorized users of such cellular phone terminal.

Activation or non-activation of the three data processing functions, i.e., the address book function, the bookmark function and the mailbox function that handle private information and then downloading or deletion of user data (private information) from the address book server 204, the bookmark information server 205 and the mailbox server 206 is described to be made depending on whether the cellular phone terminal enters the wireless LAN area or moves outside the wireless LAN area in this particular embodiment. However, it is possible to differently set the activation/non-activation of the data processing functions or change the information (user data) to be downloaded/deleted depending on the user of the cellular phone terminal. In other words, change is made in at least one part of the function of at least one data processing functions that is activated by activation means or non-activated by non-activation means depending on the user of the cellular phone terminal. Alternatively, it is set to change at least one part of the information of the information (user data) to be downloaded/deleted depending on the user of the cellular phone terminal.

It is also possible to provide a plurality of wireless LAN areas and change the data processing functions to be restricted for each wireless LAN area, differentiate at least one part of function of the data processing functions to be restricted, change the information (user data) to be downloaded/deleted, or change the information (user data) to be downloaded/deleted, for example, in the address book for each wireless LAN area. Moreover, it is possible to set so as to change at least one part of the function of at least one data processing functions or change at least one part of information of the information (user data) to be downloaded/deleted depending on locations of the wireless LAN areas. This means that at least one part of the function of at least one data processing function of the data processing functions to be activated by activation means or non-activated by non-activation means is set differently depending on the plurality of private networks. Moreover, at least one part of the information of the information that are stored by downloading by downloading means or deleted by deleting means is differentiated. In this instance, in case of the use, for example, in a company in which different wireless LAN areas are prepared depending on user's business position, it is possible to control the degree of protection of the respective information for each wireless LAN area where the user enters.

The third exemplary embodiment of the present invention is the cellular phone system in which the cellular phone terminal is provided with connection means for connecting to a public wireless cellular phone network to be used by general public users and also to a private wireless network to be used by particular users as a closed local network, the cellular phone terminal is further provided with as a private information handling function at least one data processing function of:
(a) an address book function,
(b) a bookmark function, and
(c) a mailbox function
as well as a function for restoring or encrypting at least one of information stored in the data processing functions after encryption.

In this particular exemplary embodiment, when the cellular phone terminal enters the area of the private wireless network, at least one part of information of at least one of the three data processing functions is activated by activation means provided in the cellular phone terminal and at least one part of information that is encrypted and stored is restored by restoration means that is provided in the cellular phone terminal for making it available to the cellular phone terminal. On the other hand, when the cellular phone terminal moves outside the area of the private wireless network, at least one part of information that is restored by the restoration means is encrypted by the encryption means that is included in the cellular phone terminal for storage and at least one function of the functions that are activated by the activation means is non-activated by the non-activation means included in the cellular phone terminal.

Moreover, the cellular phone terminal of this particular embodiment comprises an encryption key server that stores encryption key data for encrypting information to be stored in each data processing function or to restore the encrypted information. The cellular phone terminal may includes encryption key acquisition means for acquiring encryption key data from the encryption key server for the cellular phone terminal user. In case of restoring information stored in each data processing function after encryption by using the encryption key data that is acquired from the encryption key server, when storing the restored information after encrypting such information again, it is possible to encrypt again at least one part of information of at least one of the restored information by using the same encryption key data that is acquired from the encryption key server by the encryption key acquisition means at the time of restoration. Encryption may be made by using encryption key data different from the one that is acquired by the encryption key acquisition means at the time of restoration.

Now, a detailed description of this particular exemplary embodiment will be made hereunder with reference to the drawings.

FIG. 3 shows a system configuration of the third exemplary embodiment of the cellular phone system according to the present invention. As shown in the system configuration in FIG. 3, this particular embodiment of the cellular phone system comprises a network 302, a wireless LAN access point (WLAN AP) 303, a key data server 310 and a cellular phone terminal 308.

Although the wireless LAN area 309 in FIG. 3 will be described as a service area of the wireless LAN access point 303 installed in a company, it should not be restricted to a wireless LAN but may be a private wireless network installed, for example, in a company.

Similarly, although this particular exemplary embodiment will be described that the cellular phone terminal 308 is provide with three data processing functions, i.e., an address book function 308a, a bookmark function 308b and a mailbox function 308c as private information handling functions, the present invention should not be restricted to such particular data processing functions and is effective for any function that handles private information.

The cellular phone terminal 308 is a terminal that can be used in either one of a public wireless cellular phone network usable in a cellular phone area of a wireless cellular phone base station that is not shown in FIG. 3 and a wireless LAN network usable in the wireless LAN area 309 of the wireless LAN access point 303 in FIG. 3. As shown in FIG. 3, the cellular phone terminal 308 is located in a particular area so-called the wireless LAN area 309, for example, in a company and is in a distinctive condition to be used for the business of the company.

At this time, the cellular phone terminal 308 is in the condition that the three data processing functions of the address book function 308a, the book mark function 308b and the mailbox function 308c are activated. This means that the user of the cellular phone terminal 308 is able to use any one of the data processing functions after restoring information stored in the address book, the bookmark and the mailbox by using the encryption key data that is prepared in advance for the user of the cellular phone terminal 308 or by using the encryption key data for the user of the cellular phone terminal 308 that is downloaded from the key data server 310 to be connected by way of the wireless LAN access point 303 and the network 302. Accordingly, as long as the user remains in the wireless LAN area 309, he/she is able to use, for example, the address book function 308a and conduct a search for a particular telephone number memorized in the cellular phone terminal 308 in the restored condition and call the phone number.

On the other hand, when the cellular phone terminal 308 moves outside the wireless LAN area 309 of the wireless LAN access point 303, information restored using the encryption key data for the user of the cellular phone terminal 308 is encrypted again using the encryption key data and stored in the address book, the bookmark and the mailbox. The three data processing functions of the address book function 308a, the book mark function 308b and the mailbox function 308c handling private data that were usable so far are now set to the non-activation condition, thereby disabling the user of the cellular phone terminal 308 to use anyone of the data processing functions. Accordingly, so long as the user is outside the wireless LAN area 309, he/she is unable to call using any telephone number registered in, for example, the address book function 308a or browse the telephone numbers, thereby preventing private information from leaking in the similar manner as the first and second embodiments.

When moving outside the wireless LAN area 309, it is possible to perform encryption without newly acquiring the encryption key data from the key data server 310 if encrypted information is stored in the address book, the bookmark and the mailbox by using the same encryption key data as used for restoration when entered the wireless LAN area. On the other hand, in case of using any encryption data different from the one used for restoration when entering the wireless LAN area 309, protection for private information to be stored in the address book, the bookmark and the mailbox will be enhanced. In this case, it is necessary to save the different encryption data used for encryption in the key data server 310 by way of the wireless LAN access point 303 and the network 302 in preparation for the next entrance in the wireless LAN area.

On the contrary, when the cellular phone terminal that was outside the wireless LAN area 309 enters the wireless LAN area 309, the three data processing functions of handling private information, i.e., the address book function, the bookmark function and the mailbox function that were not usable are now activated. This means that the user of the cellular phone terminal is able to use anyone of the data processing functions by restoring the information stored in the address book, the bookmark and the mailbox using the encryption key data that is prepared in advance for the user of the cellular phone terminal or an encryption key data for the user of the cellular phone terminal that is downloaded from the key data server 310 after connecting by way of the wireless LAN access point 303 and the network 302.

Generally, as shown in the entrance/exit management area 301 in FIG. 3, the wireless LAN area 309 is installed in a company or the like where anybody other than proper user of the cellular phone terminal is difficult to enter the wireless LAN area 309 in such company for handling the private information by utilizing the functions in the cellular phone terminals because of restricted entry into the plant of such company or careful watching by security personnel or the like. Accordingly, it is most likely that persons who use the cellular phone terminal in the wireless LAN area 309 are the proper user of the cellular phone terminal or other users permitted to use such cellular phone terminal.

It is described in this particular embodiment that activation or non-activation of the three data processing functions of the address book function, the bookmark function and the mailbox function and subsequent restoration or encryption of the information (private information) stored in the address book, the bookmark and the mailbox is performed depending on whether the cellular phone terminal is in the wireless LAN area or outside such area. It is to noted, however, that the data processing functions to be activated or non-activated and the information (user data) to be restored or encrypted may be set to differ depending on the user of the cellular phone terminal. In other words, out of at least one data processing functions that are activated by the activation means or non-activated by the non-activation means depending on the user of the cellular phone terminal, at least one part of such functions is differentiated and at least one part of information of the restored/ encrypted information (user data) may be differentiated.

It is also possible to provide a plurality of wireless LAN areas each having different data processing functions to be restricted, differentiate at least one part of data processing functions to be restricted, differentiate information (user data) to be restored/encrypted, or differentiate information (user data) to be restored/encrypted in, for example, the address book. This means that at least one part of the function of at least one of the data processing functions to be activated by the activation means or non-activated by the non-activation means is set to be different depending on particular one of the plurality of private wireless networks. Moreover, it is possible to differentiate at least one part of information of the information to be restored by the restoration means or encrypted by the encryption means. In this case, if it is the use in, for example, a company, it is possible to enhance the protection of individual information for each wireless LAN area by differentiating the wireless LAN areas that are permitted to enter depending on the business position of the user in the company.

The fourth exemplary embodiment of the present invention comprises a cellular phone terminal provided with means for connecting to a public wireless cellular phone network usable by general public users and an address book server including means for connecting to a private network usable by particular users as a closed network and means for connecting to a public telephone network to which a wireless cellular phone base station of the public wireless cellular phone network or an IP network, wherein the cellular phone terminal calls the address book server and then the address book server calls based on the address book information stored in the address book server for relaying the call of the cellular phone terminal or transferring the call from the cellular phone terminal.

Moreover, the cellular phone terminal may comprise at least one of
(a) a calling function using ISDN sub-address and
(b) a DTMF signal transmission function
and the address book server may select address book data in the address book server based on the received sub-address or the DTMF signal or by a voice recognition function to the received voice for controlling where to call/transfer from the address book server. If the address book server receives a call from the cellular phone terminal having particular telephone numbers to prohibit the use of the address information stored in the address book server or ID (identification) information such as telephone numbers not permitted to use, IP addresses or the like, it is possible to set not to use the address book data and also not to call, relay/transfer from the address book server.

Now, the fourth exemplary embodiment will be described in detail with reference to the accompanying drawings.

Figure 4:
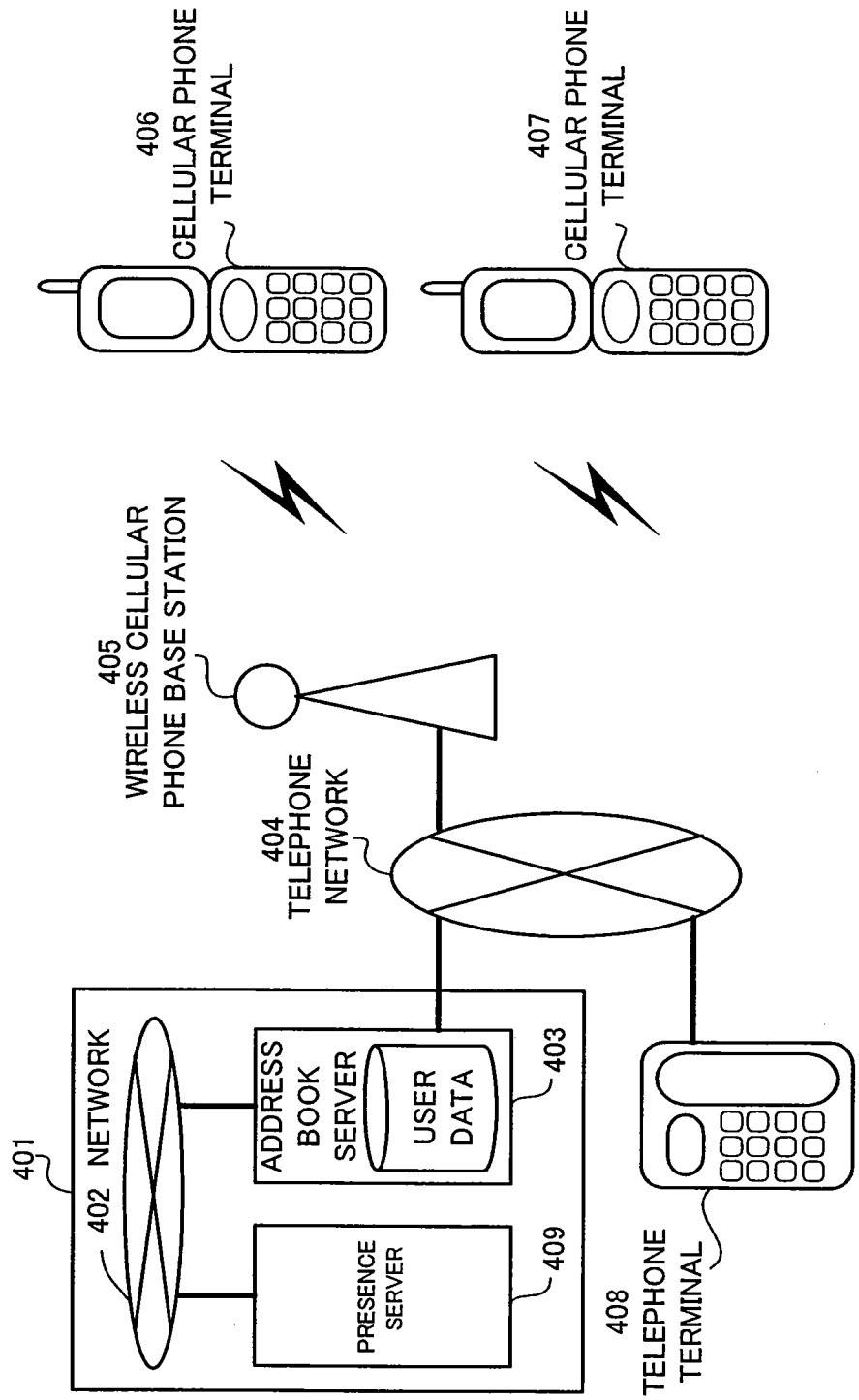
FIG. 4 shows the system configuration of a fourth exemplary embodiment of the cellular phone system according to the present invention.

FIG. 4 shows the system configuration of the fourth exemplary embodiment of the cellular phone system according to the present invention. As shown in the system configuration in FIG. 4, the fourth exemplary embodiment of the cellular phone system comprises an address book management system 401, a telephone network 404, a wireless cellular phone base station 405, cellular phone terminals 406, 407 and a telephone terminal 408. The address book management system 401 comprises a network 402, an address book server 403 and a presence server 409. The presence server 409 is a presence device that registers current locations of users of the cellular phone terminals.

It is to be noted in this exemplary embodiment that the telephone network 404 may be a VoIP (Voice over IP) that uses an IP network and a Session Initiation Protocol (SIP) for connecting a call.

The cellular phone terminal 406 has no telephone number data as the address book in the cellular phone terminal 406. As a result, in order to use the address book function, firstly, it is necessary to call the address book server 403 in the address book management system 401 for making connection to the address book server 403 by way of the wireless cellular phone base station 405 and the telephone network 404. The address book server 403 that is connected to the telephone network 404 receives the call from the cellular phone terminal 406. A judgment is made on the user of the cellular phone terminal 406 from the telephone number of the calling cellular phone terminal 406 and a search is conducted on the private information (user data) for the user in the address book. Then, the call of the cellular phone terminal 406 is transferred to the cellular phone terminal 407 or the telephone terminal 408 that the user likes to call or alternatively such call from the cellular phone 406 is relayed by the address book server 403 to call the cellular phone terminal 407 or the telephone terminal 408.

Unexpectedly, if the cellular phone terminal 406 is lost or stolen, such case has immediately been registered in the address book server 403. When the address book server 403 is called by the cellular phone terminal 406, leakage of private information is prevented by refusing to receive the call by the address book server 403 or by prohibiting the search of the address book by the cellular phone terminal 406. In other words, if there is a call from the cellular phone terminal 406 to prohibit the use of the address information that is stored in the address book server 403 or non-permitted telephone number, the address book server 403 is able to set not to relay or transfer any call from the particular cellular phone terminal 406.

Moreover, if it is possible to recognize the location of the user of the cellular phone terminal 406 by means of, for example, entrance permission to the plant, entrance/exit management or the like and report it to the presence server 409 in the address book management system 401, the address book server 403 that receives a call from the cellular phone terminal 406 asks the presence server 409 about the location of the user of the cellular phone terminal 406. After confirming whether user is in the plant or not, a decision is made whether the search of the address book or transfer or relay of a call should be permitted or refused, thereby restricting any unauthorized use of the address book in case when the cellular phone terminal is lost or stolen.

Figure 5:
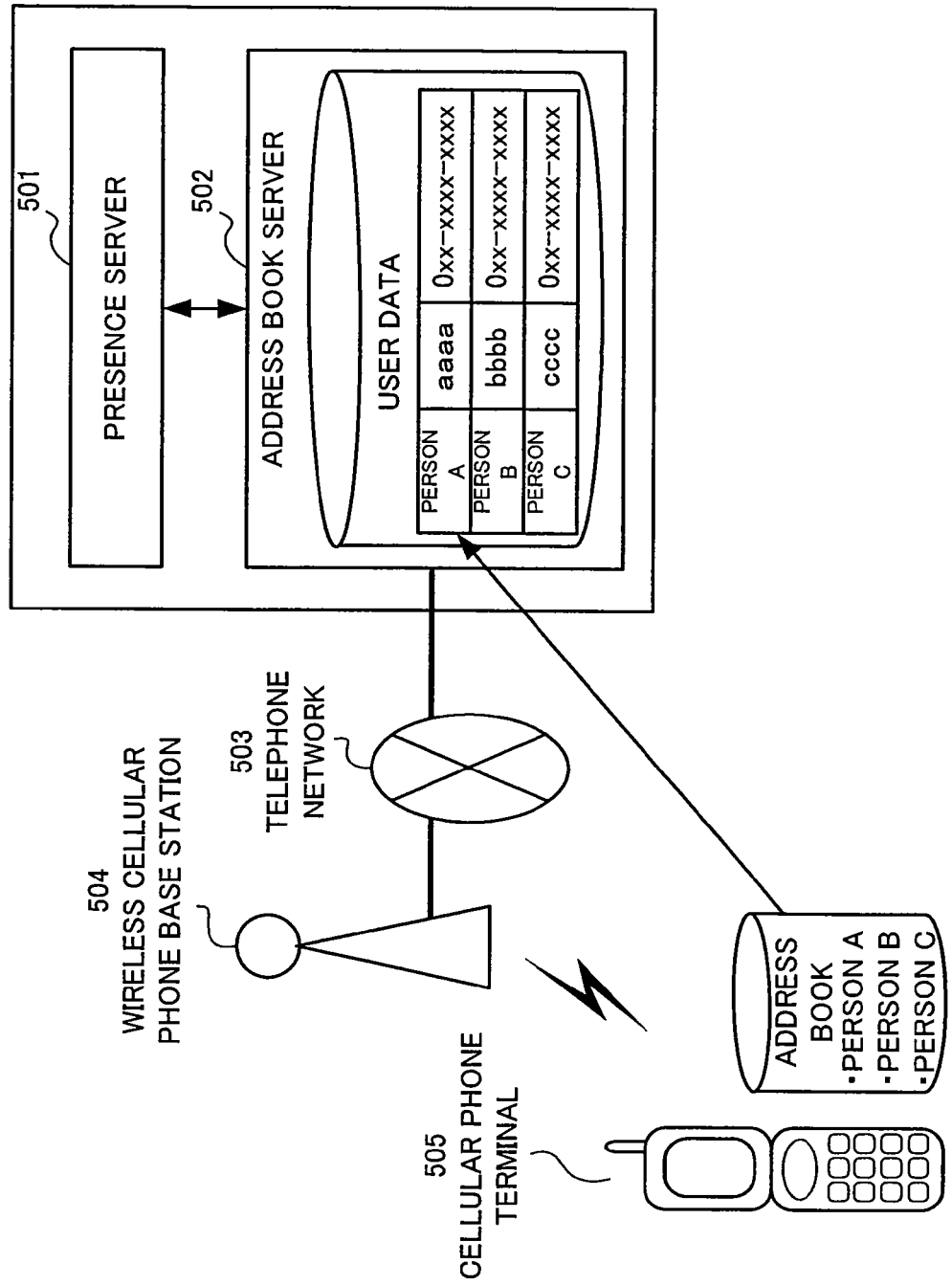
FIG. 5 is an exemplified chart to describe how a telephone number search is conducted in the fourth exemplary embodiment of the cellular phone system according to the present invention.

Methods of searching a desired number for connecting the cellular phone terminal 406 by the address book server 403 include the use of the sub-address of the ISDN, the use of the DTMF signal or by voice recognition. Such search methods will be described further with reference to FIG. 5. FIG. 5 is a chart to describe one exemplified search method of telephone numbers in the fourth embodiment of the cellular phone system according to the present invention.

In FIG. 5, the cellular phone terminal 505 (corresponding to the cellular phone terminal 406 in FIG. 4) is connected to the address book server 502 (corresponding to the address book server 403 in FIG. 4) by way of the wireless cellular phone base station 504 and the telephone network 503. Assuming in this instance that, for example, the user of the cellular phone terminal 505 likes to call a cellular phone terminal of "person A", "aaaa (number)" is assigned to the address book server 502 as the sub-address of the ISDN. Then, the address book server 502 conducts a search of the address book for the user of the cellular phone terminal 505 using the number "aaaa" for transferring to the telephone number for "person A" or relaying the call to "person A" and the call of the cellular phone terminal 505.

Similarly, as for the method of using the DTMF signal, if the user of the cellular phone terminal 505 likes to call, for example, "person B", the cellular phone terminal 505 sends the DTMF signal "bbbb (number)" to the address book server 502 by key operation. Then, the address book server 502 searches the address book of the user of the cellular phone terminal 505 using the number "bbbb", thereby transferring to the telephone number of "person B" or relaying the call to "person B" and the call of the cellular phone terminal 505.

Similarly, as for the method by voice recognition, if the user of the cellular phone terminal 505 likes to call, for example, "person C", voice instructions such as "person C" or "cccc" are given to the address book server 502. Then, the voice recognition function of the address book server 502 recognizes the voice instructions and transfers to the telephone number of "person C" or relays the call to "person C" and the call the cellular phone terminal 505. Additionally, if voice certification is made in the voice recognition, it is possible to restrict the use of the address book of the address book server 502 by any unauthorized user of the cellular phone terminal.

The fifth exemplary embodiment of the present invention is the cellular phone system comprising a cellular phone terminal including means for connecting to an IP network by way of a public wireless cellular phone network to be used by general public, an address book server including means for connecting to the IP network by way of an HTTP server in a private network to be used by particular users as a closed network, a book mark information server including means for connecting to the IP network by way of the HTTP server in a private network to be used by particular users as a closed network, a mailbox server including means for connecting to the IP network by way of the HTTP server in a private network to be used by particular users as a closed network, and the HTTP server connected to the IP network for disclosing information stored in the address book server, the book mark information server and the mailbox server in accordance with the HTTP (HyperText Transfer Protocol) protocol.

In this exemplary embodiment, the cellular phone terminal is connected to the HTTP server for calling based on the telephone number information as included in the address book server. Alternatively, it transmits electronic mails based on the mail address information as included in the address book server, makes an internet web connection based on the book mark information as included in the book mark information server, or browses electronic mail information as included in the mailbox server.

Moreover, if the cellular phone terminal is connected to the HTTP server, the cellular phone terminal user certification is performed to decide whether or not information can be disclosed. It is possible not to disclose information to particular cellular phone terminal.

Now, the fifth exemplary embodiment of the present invention will be described in detail hereunder with reference to the accompanying drawing.

Figure 6:
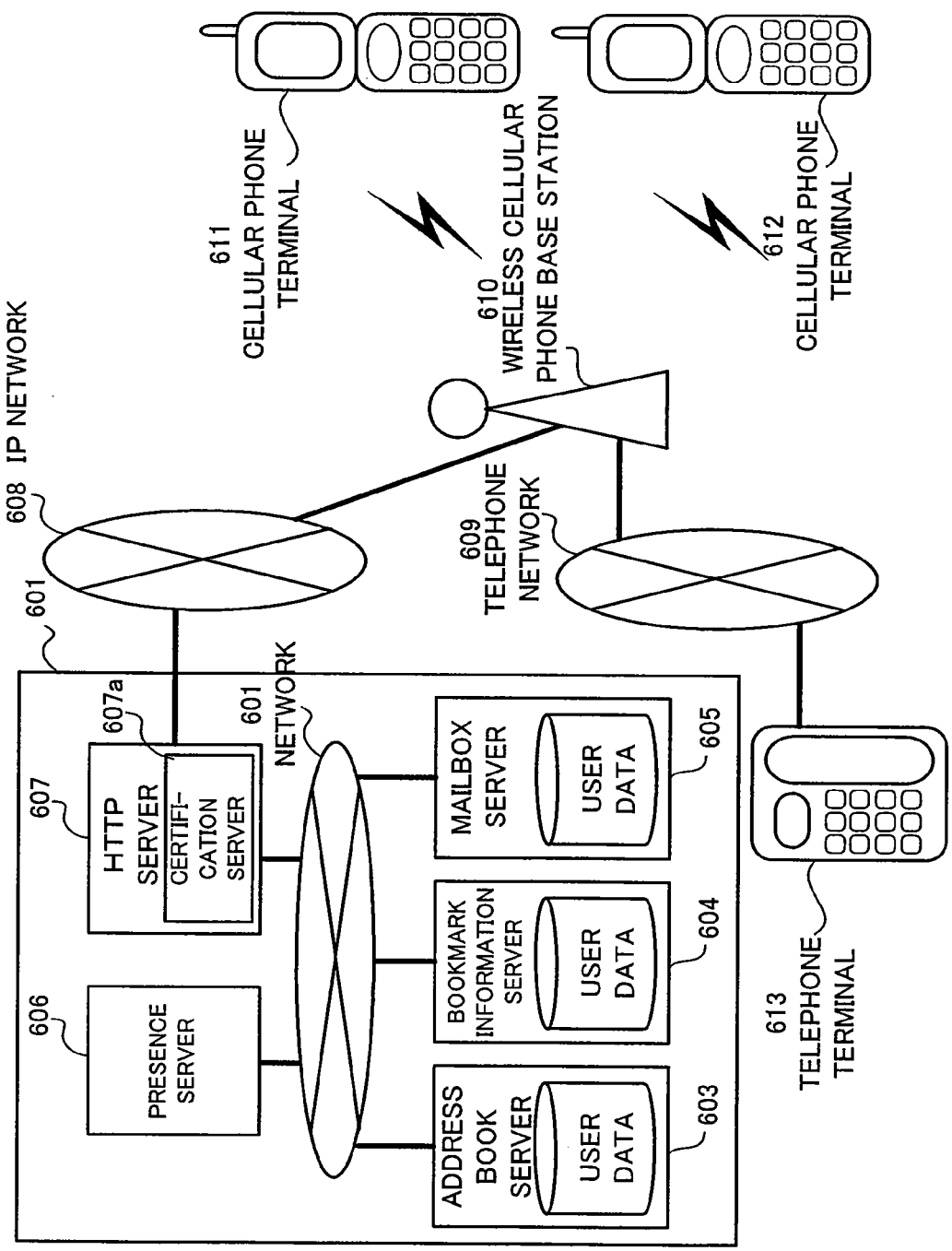
FIG. 6 shows the system configuration of a fifth exemplary embodiment of the cellular phone system according to the present invention.

FIG. 6 shows the system configuration of the fifth exemplary embodiment of the cellular phone terminal according to the present invention. As shown in the system configuration in FIG. 6, this exemplary embodiment of the cellular phone system comprises a cellular phone private information management system 601, an IP network 608, a telephone network 609, a wireless cellular phone base station 610, cellular phone terminals 611, 612 and a telephone terminal 613. The cellular phone private information management system 601 comprises a network 602, an address book server 603, a bookmark information server 604, a mailbox server 605, a presence server 606 and an HTTP server 607. The HTTP server 607 in this particular exemplary embodiment is provided with a certification server 607a for performing user certification.

It is to be noted in this exemplary embodiment that the telephone network 609 may be a VoIP (Voice over IP) telephone that uses an IP network and connects a call using an SIP (Session Initiation Protocol) protocol. In this case, the telephone network 609 may be integrated with the IP network 608.

The cellular phone terminal 611 does not hold any data such as telephone number data as the address book, bookmark information, electronic mails or the like inside the cellular phone terminal 611. As a result, in order to use such data, it is first required to connect to the HTTP server 607 in the cellular phone private information management system 601 by way of the wireless cellular phone base station 610 and the IP network 608. The HTTP server 607 connected to the IP network 608 receives a connection request from the cellular phone terminal 611 and starts the certification server 607a for performing user certification of the cellular phone terminal 611 by means of, for example, a password or the like. If the connection of the cellular phone terminal 611 is permitted by the certification server 607a, the HTTP server 607 discloses the user data (private information) on the user that is stored in the address book server 603, the bookmark server 604 and the mailbox server 605 in accordance with HTTP or HTTPS protocol. It is possible to use the browsing technique by, for example, HTTP or HTTPS in the cellular phone terminal 611 for the way of disclosing such data. It is also possible to provide the certification server 607a separately from the HTTP server 607, thereby performing the user certification of the cellular phone terminal 611 by accessing the certification server 607a when the address book server 603, the bookmark information server 604 or the mailbox server 605 when the cellular phone terminal 611 connects thereto.

In an event that the cellular phone terminal 611 is lost or stolen, such event is immediately registered in the HTTP server 607. When the HTTP server 607 receives a connection request from the cellular phone terminal 611, the HTTP server 607 is able to refuse the connection from the particular cellular phone terminal or the connection request is refused by user certification by the certification server 607a, thereby preventing leakage of private information. In other words, the HTTP server 607 is able to prohibit connection to the address book server 603, the bookmark information server 604 or the mailbox server 605 or alternatively to refuse connection to the cellular phone terminal 611 when there is a receiving call from the cellular phone terminal 611 having the non-permitted telephone number. Moreover, it is possible that the address book server 603, the bookmark information server 604 or the mailbox server 605 is prohibited to use the address book data stored in the address book server 603, the bookmark information stored in the bookmark information server 604 or the electronic mail information stored in the mailbox server 605 or alternatively refusing connection to the cellular phone terminal 611 when there is a connection request from the cellular phone terminal 611 having the non-permitted telephone number by way of the HTTP server 607.

Furthermore, in case of registering the location of the user of the cellular phone terminal 611 in the presence server 606 in the cellular phone private information management system 601 by recognizing through any method such as, for example, entrance/exit control or the like by entrance permission, etc., the HTTP server 607 that receives a connection request from the cellular phone terminal 611 asks the presence server 606 about the location of the user of the cellular phone terminal 611. After confirming whether or not the user is in the plant, a decision will be made whether the information in the address book, the bookmark or the mailbox should be disclosed or refused, thereby restricting the use of such private information in case when the cellular phone terminal 611 is lost or stolen. Instead of asking the present location of the user of the cellular phone terminal 611 by the HTTP server 607, it is also possible that the address book server 603, the bookmark information server 604 or the mailbox server 605 asks the location of the user and a decision is made whether the connection to the cellular phone terminal 611 is permitted or refused based on the current location of the user of the cellular phone terminal 611 that is registered in the presence server 606 at the time of connection from the cellular phone terminal 611.

Figure 7:
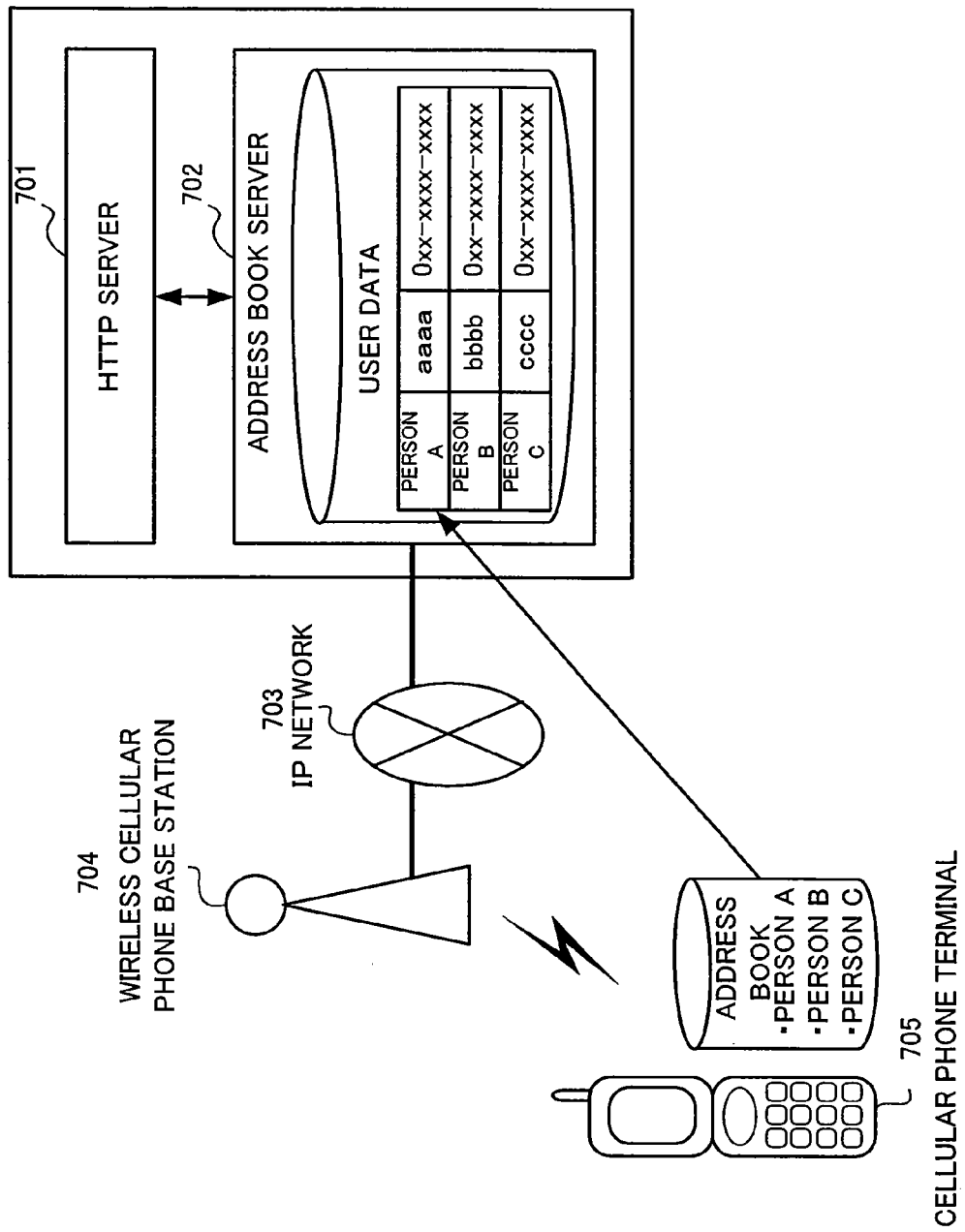
FIG. 7 is an exemplified chart to describe how a telephone number search is conducted in the fifth exemplary embodiment of the cellular phone system according to the present invention.

Now, a method of searching the address book server 603 or the bookmark information server 604 for a desired telephone number that the cellular phone terminal 611 is connected will be described further with reference to FIG. 7 in an example of the address book server 603. FIG. 7 is a chart to describe one example of searching a telephone number in the fifth embodiment of the cellular phone system according to the present invention.

In FIG. 7, the cellular phone terminal 705 (corresponding to the cellular phone terminal 611 in FIG. 6) is connected to the HTTP server 701 (corresponding to the HTTP server 607 in FIG. 6) by way of a wireless cellular phone base station 704 and an IP network 703. After passing the certification in the HTTP server 701, it is possible on the cellular phone terminal 705 to browse the address to contact each user of the cellular phone terminal 705 that is stored in an address book server 702 (corresponding to the address book server 603 in FIG. 6).

If the user of the cellular phone terminal 705 chooses one address for, for example, "person A" among many addresses that he/she browsed, the HTTP server 701 calls the telephone number of "person A" using, for example, "phone to" in the HTML language. In this way, it is possible to call the telephone number in the address book on the cellular phone terminal 705 that is stored in the address book server 702 without saving the telephone number information in the cellular phone terminal 705. In other words, if described based on the system configuration in FIG. 6, one of the telephone numbers that are registered in the address book server 603 as private information of the user of the cellular phone terminal 611 is selected and the telephone number that is described in the HTML language "phone to" is transmitted to the IP network 608, thereby enabling to call the cellular phone terminal 612 or the telephone terminal 613 by way of, for example, the telephone network 609.

Figure 8:
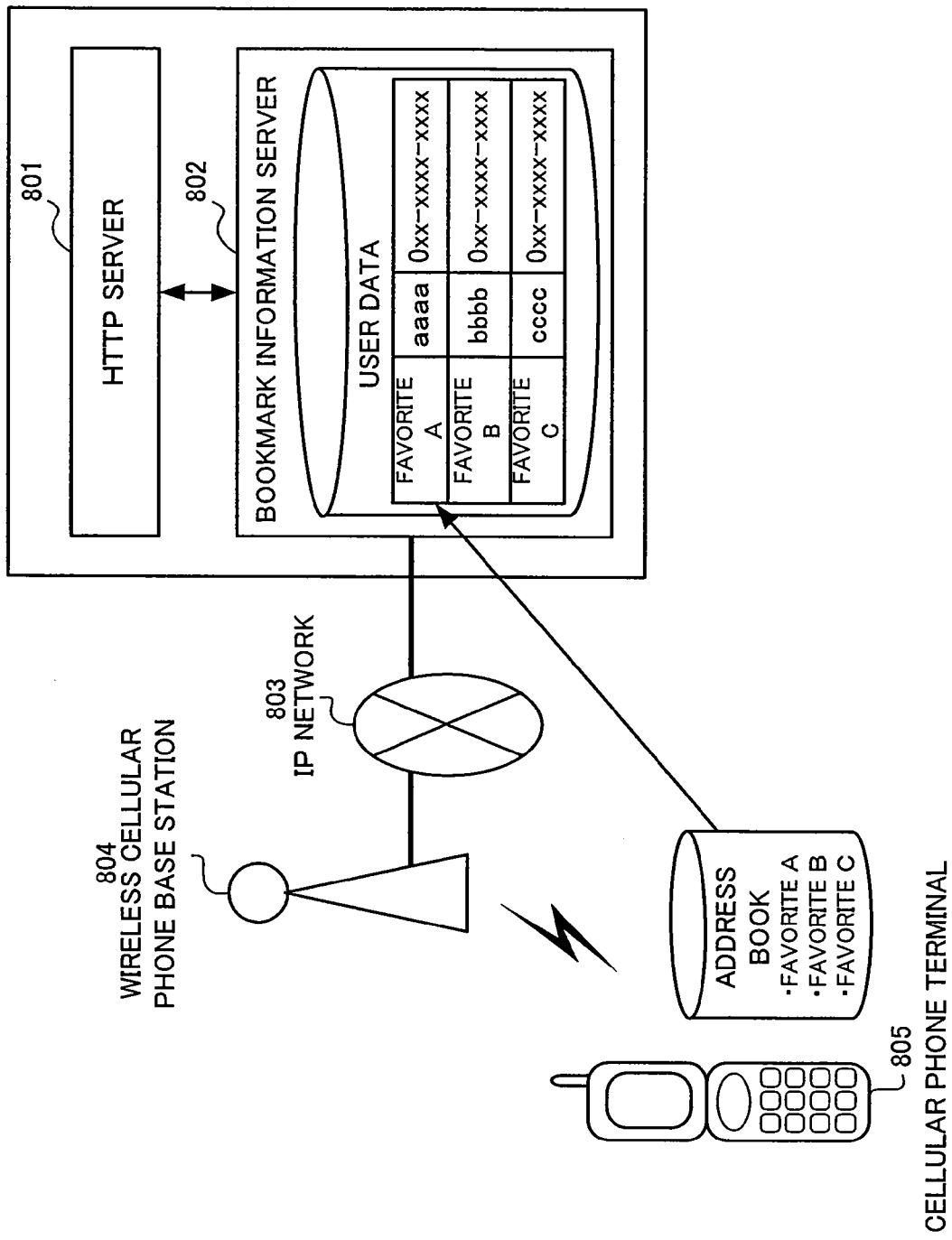
FIG. 8 is an exemplified chart to describe how a bookmark search is conducted in the fifth exemplary embodiment of the cellular phone system according to the present invention.

Subsequently, a method of searching a desired bookmark of the cellular phone terminal 611 in the bookmark information server 604 will be described further with reference to FIG. 8. FIG. 8 is a chart to describe an exemplified method of searching bookmarks in the fifth embodiment of the cellular phone system according to the present invention.

In FIG. 8, a cellular phone terminal 805 (corresponding to the cellular phone terminal 611 in FIG. 6) is connected to an HTTP server 801 (corresponding to the HTTP server 607 in FIG. 6) by way of a wireless cellular phone base station 804 and an IP network 803. After passing certification by the HTTP server 801, it is possible on the cellular phone terminal 805 to browse bookmark information on the users of the cellular phone terminal 805 stored in a bookmark information server 802 (corresponding to the bookmark information server 604 in FIG. 6) in accordance with HTTP or HTTPS.

When the user of the cellular phone terminal 805 chooses a bookmark information, for example, his/her "favorite A" from the browsed bookmark information, the HTTP server 801 makes a connection to a web server of his/her "favorite A" described in, for example, "URL" in the HTML language. In this manner, it is possible to access the web server on internet using the bookmark information on the cellular phone terminal 805 that is stored in the bookmark information server 802 without saving the bookmark information in the cellular phone terminal 805. In other words, if described using the system configuration in FIG. 6, any one of the bookmark information that is registered in the bookmark information server 604 as the private information for the user of the cellular phone terminal 611 for transmitting the address information described in "URL" in the HTML language to the IP network 608, thereby enabling to access to the web server on internet.

Figure 9:
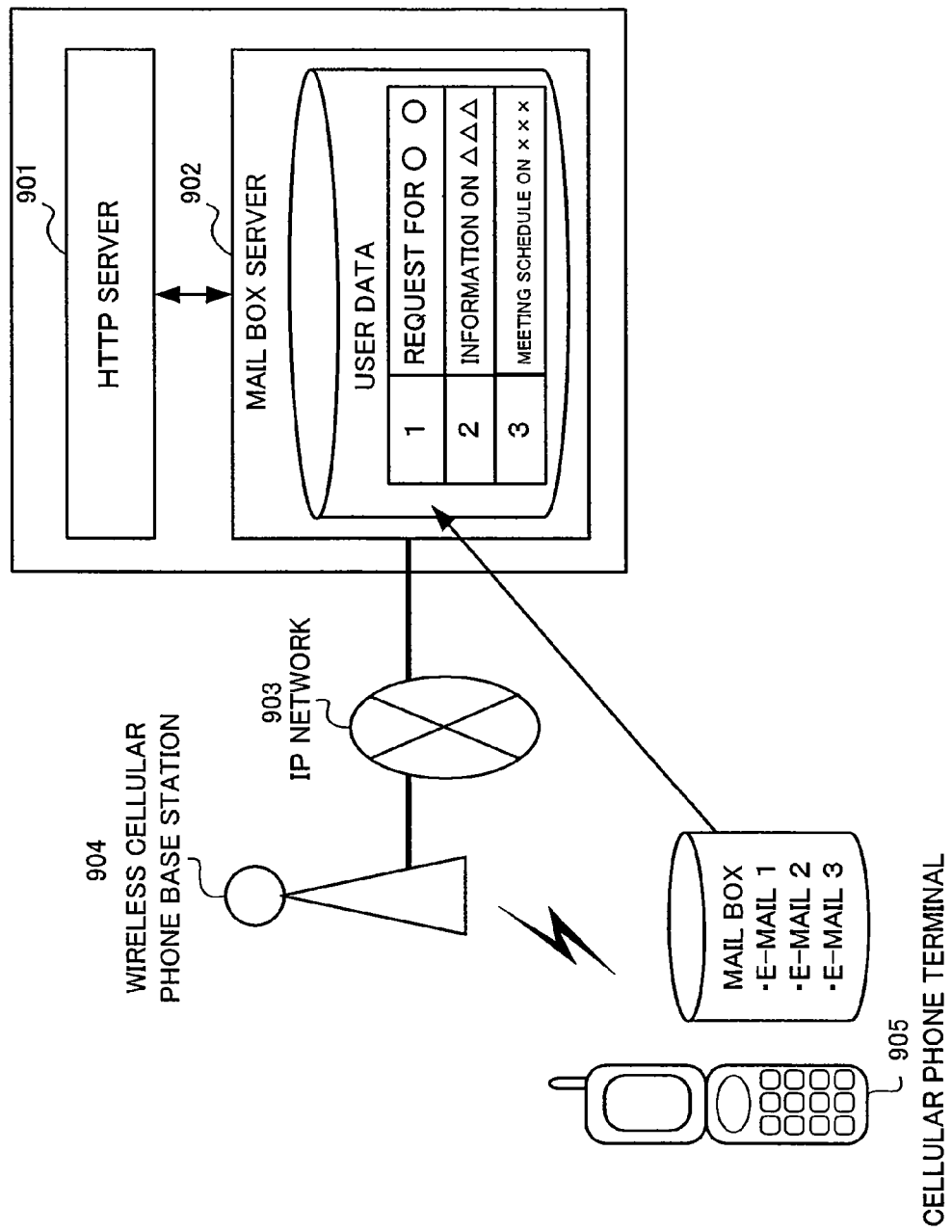
FIG. 9 is an exemplified chart to describe how an e-mail information search is conducted in the fifth exemplary embodiment of the cellular phone system according to the present invention.

Now, a method of searching desired electronic mail information of the cellular phone terminal 611 by the mailbox server 605 is described further with reference to FIG. 9. FIG. 9 is a chart to describe an exemplified method of searching electronic mail information in the fifth exemplary embodiment of the cellular phone system according to the present invention.

In FIG. 9, a cellular phone terminal 905 (corresponding to the cellular phone terminal 611 in FIG. 6) is connected to an HTTP server 901 (corresponding to the HTTP server 607 in FIG. 6) by way of a wireless cellular phone base station 904 and an IP network 903. After passing certification in the HTTP server 901, it is possible to browse on the cellular phone terminal 905 electronic mail information on users of the cellular phone terminal 905 stored in a mailbox server 902 (corresponding to the mailbox server 605 in FIG. 6) in accordance with HTTP, HTTPS or IMAP4 protocol.

When the user of the cellular phone terminal 905 chooses one of the electronic mail information, for example, electronic mail 1 from the browsed electronic mail information, the HTTP server 901 reads out the electronic mail 1 under the title of "Request for . . . ." stored in the mailbox server 902 and transmits it to the cellular phone terminal 905 in accordance with the HTTP, HTTPS or IMAP4 protocol. In this manner, it is possible to browse the electronic mail information on the cellular phone terminal 905 stored in the mailbox server 902 without saving the electronic mail information in the cellular phone terminal 905. In other words, describing in the system configuration in FIG. 6, it is possible to browse any desired electronic mail information in accordance with HTTP, HTTPS or IMAP4 protocol by choosing any one of the electronic mail information stored in the mailbox server 605 as the private information of the user of the cellular phone terminal 611.

As described in greater detail hereinabove, the exemplary embodiments of the present invention are able to surely prevent private information from leaking in an unexpected situation when the cellular phone terminal is lost or stolen. Also, the present invention provides the aforementioned advantage without causing any inconvenience to the user of the cellular phone terminal. Moreover, the present invention is able to provide the aforementioned advantage with paying essentially no attention to private information protection by the user of the cellular phone terminal.

According to the present invention may provide the following featured exemplary embodiments:

(1) A cellular phone terminal defined in the invention stated in the Summary, wherein the private network comprises a plurality of private networks which differ in at least one part of the function of at least one data processing function of the data processing functions to be activated by the activation means and non-activated by the non-activation means depending on the private networks.

(2) A cellular phone terminal defined in the invention stated in the Summary, wherein at least one part of the function of the at least one data processing function of the data processing functions to be activated by the activation means and non-activated by the non-activation means differs.

(3) A cellular phone terminal to be connected to both of a public wireless cellular phone network available to general public users and a private wireless network closed to be available to particular users, comprising: at least one data processing function of an address book function, a bookmark function and a mailbox function; download means for downloading and saving from at least one of an address book server that stores address book information to be used in the address book function, a bookmark information server that stores bookmark information to be used in the bookmark function and a mailbox server that stores electronic mail information to be used in the mailbox function the information relating to users of the cellular phone terminal and/or at least one part of information common to all users when the cellular phone terminal enters the wireless area of the private wireless network; and deleting means for deleting at least one part of the information that is downloaded and saved by the download means when moving outside the wireless area of the private wireless network.

(4) A cellular phone terminal of the above (3), wherein the private network comprises a plurality of private networks that differ in at least one part of the information to be downloaded and saved by the download means and deleted by the deleting means depending on the private wireless networks.

(5) A cellular phone terminal of the above (3), wherein at least one part of the information of the information to be downloaded and saved by the download means and deleted by the deleting means differs depending on the user of the cellular phone terminal to be used.

(6) A cellular phone terminal to be connected to both of a public wireless cellular phone network available to general public users and a private wireless network closed to be available to particular users, comprising: at least one data processing functions of an address book function, a bookmark function and a mailbox function; restoration means for restoring at least one part of the information of at least information of encrypted address book information, encrypted bookmark information and encrypted electronic mail information when the cellular phone terminal enters the wireless area of the private wireless network; and encryption means for encrypting at least one part of the information restored by the restoration means when moving outside the wireless area of the private wireless network.

(7) A cellular phone terminal to be connected to both of a public wireless cellular phone network available to general public users and a private wireless network closed to be available to particular users, comprising: at least one data processing functions of an address book function, a bookmark function and a mailbox function; encryption key acquisition means for acquiring encryption key data for the user of the cellular phone terminal from an encryption key server that stores the encryption key data when the cellular phone terminal enters the wireless area of the private wireless network; restoration means for restoring at least one part of the at least one information of the encrypted address book information, encrypted bookmark information and encrypted electronic mail information using the encryption key data acquired by the encryption key acquisition means; and encryption means for encrypting at least one part of the information restored by the restoration means.

(8) A cellular phone terminal of the above (7), wherein the encryption key data for encrypting at least one part of the restored at least one information by the encryption means when moving outside the wireless area of the private wireless network is the same as or different from the encryption key data acquired by the encryption key acquisition means when entering the wireless area of the private wireless network.

(9) A cellular phone terminal of either one of the above (6) to (8), wherein the private network comprises a plurality of private networks that differ in at least one part of the information of the information to be restored by the restoration means and encrypted by the encryption means depending on the private wireless networks.

(10) A cellular phone terminal of either one of the above (6) to (9), wherein at least one part of the information to be restored by the restoration means and encrypted by the encryption means differs depending on the user of the cellular phone terminal.

(11) A cellular phone terminal of either one of the above (3) to (10), wherein the private wireless network is a wireless LAN.

(12) A cellular phone system comprising at least a cellular phone terminal provided with at least means for connecting to a wireless cellular phone network available to general public users and an address book server to be connected to a wireless cellular phone network, a public telephone network or an IP network available to general public users, wherein the address book server stores telephone numbers for cellular phone terminals or telephone terminals that each cellular phone terminal likes to call, when the address book serve receives a call from the cellular phone terminal by way of the wireless cellular phone network, the public telephone network or the IP network, a call is made to the cellular phone terminal or the telephone terminal that the cellular phone terminal likes to call by way of the wireless cellular phone network, the public telephone network or the IP network for relaying the call from the cellular phone terminal based on the telephone numbers stored in the respective cellular phone terminal.

(13) A cellular phone system comprising at least a cellular phone terminal including at least means for connecting to a wireless cellular phone network available to general public users and an address book server to be connected to a wireless cellular phone network, a public telephone network or an IP network available to general public users, wherein the address book server stores telephone numbers of cellular phone terminals or telephone terminals that each cellular phone terminal likes to call, when the address book server receives a call from the cellular phone terminal by way of the wireless cellular phone network, the public telephone network or the I network, the call from the cellular phone terminal is transferred by way of the wireless cellular phone network, the public telephone network or the IP network based on the telephone numbers stored in the respective cellular phone terminal.

(14) A cellular phone system of the above (12) or (13), wherein the address book server is able to search the telephone number that the cellular phone terminal likes to call by either an ISDN sub-address, a DTMF signal or voice information that is transmitted from the calling cellular phone terminal.

(15) A cellular phone system of either one of the above (12) to (14), wherein the address book server decides to permit or refuse the use of the address information stored therein and/or relaying or transferring the call from the cellular phone terminal by the ID information of the cellular phone terminal from which a call is received.

(16) A cellular phone system of either one of the above (12) to (15), further comprising a presence device for registering the current location of the user of each cellular phone terminal, and when receiving a call from the cellular phone terminal, the address book server decides to permit or refuse relaying or transmitting a call from the address book server in response to the current location of the user of the cellular phone terminal registered in the presence device.

(17) A cellular phone system comprising at least a cellular phone terminal including at least means for connecting to an IP network by way of a wireless cellular phone network available to general public users, an address book server for storing as address book data telephone numbers of cellular phone terminals or telephone terminals that each cellular phone terminal likes to call, and an HTTP server connected to the IP network and the address book server for performing data communication between the cellular phone terminal and the address book server in accordance with the HTTP or HTTPS protocol, characterized in that when acquiring the address book data of the cellular phone terminal stored in the address book server, the cellular phone terminal is connected to the HTTP server by way of the wireless cellular phone network and the IP network for acquiring the address book data from the address book server by way of the HTTP server in accordance with the HTTP or HTTPS protocol.

(18) A cellular phone system comprising at least a cellular phone terminal including at least means for connecting to an IP network by way of a wireless cellular phone network available to general public users, a bookmark information server for storing the address of a web server for each cellular phone terminal as bookmark information, and an HTTP server connected to the IP network and the bookmark information server for performing data communication between the cellular phone terminal and the bookmark information server in accordance with the HTTP or HTTPS protocol, characterized in that when acquiring the bookmark information of the cellular phone terminal stored in the bookmark information server, the cellular phone terminal is connected to the HTTP server by way of the wireless cellular phone network and the IP network for acquiring the bookmark information from the bookmark information server by way of the HTTP server in accordance with the HTTP or HTTPS protocol.

(19) A cellular phone system comprising at least a cellular phone terminal including at least means for connecting to an IP network by way of a wireless cellular phone network available to general public users, a mailbox server for storing electronic mail information for each cellular phone terminal, and an HTTP server connected to the IP network and the mailbox server for performing data communication between the cellular phone terminal and the mailbox server in accordance with the HTTP or HTTPS protocol, characterized in that when acquiring the electronic mail information for the cellular phone terminal stored in the mailbox server, the cellular phone terminal is connected to the HTTP server by way of the wireless cellular phone network and the IP network for acquiring the electronic mail information from the mailbox server by way of the HTTP server in accordance with the HTTP or HTTPS protocol.

(20) A cellular phone system of either one of the above (17) to (19), wherein the address book server, the bookmark server or the mailbox server decides to permit or refuse the use of the address book data stored in the address book server, the bookmark information stored in the bookmark information server or the electronic mail information stored in the mailbox server by the ID information of the cellular phone terminal that requests connection by way of the HTTP server.

(21) A cellular phone system of either one of the above (17) to (20), wherein the HTTP server decides to permit or refuse the connection to the address book server, the bookmark server or the mailbox server by the ID information of the cellular phone terminal from which a call is received.

(22) A cellular phone system of either one of the above (17) to (21), wherein at the time of connection from the cellular phone terminal, the address book server, the bookmark information server, the mailbox server or the HTTP server is able to perform user certification of the cellular phone terminal.

(23) A cellular phone system of either one of the above (17) to (22), further comprising a presence device for registering the current location of the user of each cellular phone terminal, and in case of connection from the cellular phone terminal, either the address book server, the bookmark information server, the mailbox server or the HTTP server decides to permit or refuse connection to the cellular phone terminal depending on the current location of the user of the cellular phone terminal as registered in the presence device.

(24) A private information protection method for protecting private information stored in a cellular phone terminal that can be connected to both of a public wireless cellular phone network available to general public users and a private wireless network closed to be used by particular users, wherein the cellular phone terminal activates at least one part of function of at least one data processing functions of the data processing functions including an address book function, a bookmark function and a mailbox function when it enters the wireless area of the private wireless network, while non-activating at least one part of the activated functions when it moves outside the wireless area of the private wireless network.

(25) A private information protection method for protecting private information stored in a cellular phone terminal that can be connected to both of a public wireless cellular phone network available to general public users and a private wireless network closed to be used by particular users, wherein the cellular phone terminal downloads and saves information on the user of the cellular phone terminal from at least one of an address book server that stores address book information available to an address book function, a bookmark server that stores bookmark information available to a bookmark function and a mailbox server that stores electronic mail information available to a mailbox function when entering a wireless area of the private wireless network, while deleting at least one part of the downloaded and saved information when moving outside the wireless area of the private wireless network.

(26) A private information protection method for protecting private information stored in a cellular phone terminal that can be connected both of a public cellular phone network available to general public users and a private wireless network closed to be used by particular users, wherein the cellular phone terminal restores at least one part of information of at least one information of encrypted address book information, encrypted bookmark information and encrypted electronic mail information when entering the wireless area of the private wireless network, while encrypting at least one part of the restored information when moving outside the wireless area of the private wireless network.

(27) A private information protection method for protecting private information stored in a cellular phone terminal that can be connected both of a public wireless cellular phone network available to general public users and a private wireless network closed to be used by particular user, wherein the cellular phone terminal acquires encryption key data for the user of the cellular phone terminal from an encryption key server that saves the encryption key data and restores at least one part of information of at least one of encrypted address book information, encrypted bookmark information and encrypted electronic mail information when entering the wireless area of the private wireless network, while encrypting at least one part of the restored information when moving outside the wireless area of the private wireless network.

(28) A private information protection method of the above (26) or (17), wherein the private wireless network comprises a plurality of private wireless networks that differ in at least one part of information to be restored when entering the wireless area of the private wireless network or encrypted when moving outside the wireless area depending on the plurality of the private wireless networks.

(29) A private information protection method of either one of the above (26) to (28), wherein at least one part of the information of the information to be restored when entering the wireless area of the private wireless network or encrypted when moving outside the wireless area is differentiate depending on the user of the cellular phone terminal.

(30) A private information protection method for protecting private information stored in a cellular phone terminal comprising at least the cellular phone terminal including at least means for connecting to an IP network by way of a wireless cellular phone network available to general public users, an address book server for storing as address book data telephone numbers of cellular phone terminals or telephone terminals that each cellular phone terminal is to be connected and an HTTP server connected to the IP network and the address book server for performing data communication between the cellular phone terminal and the address book server in accordance with the HTTP or HTTPS protocol, wherein for acquiring the address book data for the cellular phone terminal stored in the address book server, the cellular phone terminal is connected to the HTTP server by way of the wireless cellular phone network and the IP network and acquires the address book data from the address book server by way of the HTTP server in accordance with the HTTP or HTTPS protocol.

(31) A private information protection method for protecting private information stored in a cellular phone terminal in a cellular phone system comprising at least the cellular phone terminal including at least means for connecting to an IP network by way of a wireless cellular phone network available to general public users, a bookmark information server for storing as bookmark information address of a web server for respective cellular phone terminal and an HTTP server connected to the IP network and the bookmark information server for performing data communication between the cellular phone terminal and the bookmark information server in accordance with the HTTP or HTTPS protocol, wherein for acquiring the bookmark information for the cellular phone terminal stored in the bookmark server, the cellular phone terminal is connected to the HTTP server by way of the wireless cellular phone network and the IP network and acquires the bookmark information from the bookmark information server by way of the HTTP server in accordance with the HTTP or HTTPS protocol.

(32) A private information protection method for protecting private information stored in a cellular phone terminal in a cellular phone system comprising at least the cellular phone terminal including at least means for connecting to an IP network by way of a wireless cellular phone network available to general public users, a mailbox server for storing electronic mail information for respective cellular phone terminal, an HTTP server connected to the IP network and the mailbox server for performing data communication between the cellular phone terminal and the mailbox server in accordance with the HTTP or HTTPS protocol, wherein for acquiring the electronic mail information for the cellular phone terminal stored in the mailbox server, the cellular phone terminal is connected to the HTTP server by way of the wireless cellular phone network and the IP network and acquires the mailbox information from the mailbox server by way of the HTTP server in accordance with the HTTP or HTTPS protocol.

(33) A private information protection program for achieving the private information protection method of either one of the above (24) to (32) as a computer executable program.

(34) A program recording medium for storing the private information protection program of the above (33) in a computer readable recording medium.

While the invention has been particularly shown and described with reference to exemplary embodiments thereof, the invention is not limited to those embodiments. It will be understood by those of ordinary skill in the art that various changes in form and details may be made therein without departing from the spirit and scope of the present invention as defined in claims.

What is claimed is:

1. A cellular phone terminal adapted to connect to a public wireless cellular phone network and a private wireless network, the cellular phone terminal comprising:
a processor and a computer program stored in memory, the computer program, when executed by the processor, causing the processor to:
(a) when the cellular phone terminal is connected to the private wireless network:
(1) activate at least one data processing function selected from the set of an address book functionality, a bookmark functionality and a mailbox functionality;
(2) download information from an external source, the information including one or more of:
address book information to be used in the address book functionality;
bookmark information to be used in the bookmark functionality; and
electronic mail information to be used in the mailbox functionality; and
(3) store the information in the cellular phone terminal;
(b) when the cellular phone terminal is disconnected from the private wireless network:
(1) deactivate at least part of the at least one data processing function; and
(2) delete at least part of the downloaded information.

2. The cellular phone terminal of claim 1, wherein when the cellular phone terminal is disconnected from the private wireless network, the processor deactivates each of the date processing functions previously activated and deletes all of the downloaded information.

3. The cellular phone terminal of claim 1, wherein the selection of the data processing functions activated is determined as a function of the identity of the cellular phone terminal.

4. The cellular phone terminal of claim 1, wherein at least part of the stored information is encrypted when the cellular phone terminal is disconnected from the private wireless network and is decrypted when the cellular phone terminal is reconnected to the private wireless network.

5. The cellular phone terminal of claim 4, wherein the computer program causes the processor to obtain an encryption key from an encryption key server when the cellular phone terminal is reconnected to the private wireless network and uses the encryption key to decrypt the encrypted stored information.

6. A cellular phone system, comprising:
a cellular phone terminal adapted to connect to a public wireless cellular phone network;
an address book server causing a set of telephone numbers corresponding to the cellular phone terminal to be stored remotely from the cellular phone terminal, the address book server having a call relay function wherein it:
receives a call from the cellular phone terminal;
permits the user of the cellular phone terminal to select a telephone number among the stored telephone numbers that the user would like to call; and
in response to such selection, makes a call to a destination phone terminal corresponding to the selected telephone number so as to relay the call from the cellular phone terminal to the destination phone terminal.

7. The cellular phone system of claim 6, wherein the address book server responds to selection information received from the cellular phone terminal in the form of an ISDN sub-address, a DTMF signal or voice commands.

8. The cellular phone system of claim 6, wherein the address book server enables or disables the call relay function as a function of information identifying the cellular phone terminal.

9. The cellular phone system of claim 6, wherein the address book server enables or disables the call relay function as a function of the location of the cellular phone terminal.

10. The cellular phone system of claim 6, wherein the address book server also causes separate sets of telephone numbers corresponding to each of a plurality of third party cellular phone terminals to be stored remotely from the third party cellular phone terminals, the cellular phone system further comprising an HTTP server through which calls from the cellular phone terminal, as well as calls from the third party cellular phone terminals, connect to the address book server, the HTTP server determining the identity of any of the cellular phone terminals calling the address book server and permitting the calling cellular phone terminal access to only the telephone numbers corresponding to it.

11. The cellular phone system of claim 6, wherein the address book server performs user certification in response to the receipt of a call from the cellular phone terminal.

12. A cellular phone system, comprising:
a private network including an address book server, an HTTP server using HTTP or HTTPS protocol, the HTTP server interfacing the address book server and an IP network connected to a public cellular phone network;
the address book server causing a plurality of sets of telephone numbers to be stored remotely from a plurality of cellular phone terminals, each set of telephone numbers corresponding to a respective one of the cellular phone terminals;

the HTTP server receiving a connection request via the IP network, the connection request originating from one of the cellular phone terminals; and the HTTP server denying the received connection request, and therefore denying access to the address book server, if the HTTP server determines that the originating cellular phone terminal has been lost or stolen.

13. The cellular phone system of claim 12, wherein the HTTP server causes information concerning which of the cellular phone terminals have been lost or stolen to be stored and looks up that information when making the determination.

14. The cellular phone system of claim 12, wherein the HTTP server determines which of the set of telephone numbers the originating cellular phone terminal will have access to as a function of the identity of the originating cellular phone.

15. The cellular phone system of claim 12, wherein when the HTTP server performs user certification in response to the receipt of the connection request.

16. A cellular phone system, comprising:

a private network including an bookmark server, an HTTP server using HTTP or HTTPS protocol, the HTTP server interfacing the bookmark server and an IP network connected to a public cellular phone network;

the bookmark server causing a plurality of IP addresses to be stored remotely from a plurality of cellular phone terminals, each set of IP addresses corresponding to a respective one of the cellular phone terminals;

the HTTP server receiving a connection request via the IP network, the connection request originating from one of the cellular phone terminals; and the HTTP server denying the received connection request, and therefore denying access to the bookmark server, if the HTTP server determines that the originating cellular phone terminal has been lost or stolen.

17. The cellular phone system of claim 16, wherein the HTTP server causes information concerning which of the cellular phone terminals have been lost or stolen to be stored and looks up that information when making the determination.

18. The cellular phone system of claim 16, wherein the HTTP server determines which of the set of IP addresses that the originating cellular phone terminal will have access to as a function of the identity of the originating cellular phone terminal.

19. The cellular phone system of claim 16, wherein when the HTTP server performs user certification in response to the receipt of the connection request.

20. A cellular phone system, comprising:

a private network including an mailbox server, an HTTP server using HTTP or HTTPS protocol, the HTTP server interfacing the mailbox server and an IP network connected to a public cellular phone network;

the mailbox server causing a plurality of sets of email information to be stored remotely from a plurality of cellular phone terminals, each set of email information corresponding to a respective one of the cellular phone terminals;

the HTTP server receiving a connection request via the IP network, the connection request originating from one of the cellular phone terminals; and the HTTP server denying the received connection request, and therefore denying access to the address book server, if the HTTP server determines that the originating cellular phone terminal has been lost or stolen.

21. The cellular phone system of claim 20, wherein the HTTP server causes information concerning which of the cellular phone terminals have been lost or stolen to be stored and looks up that information when making the determination.

22. The cellular phone system of claim 20, wherein the HTTP server determines which sets of email information that the originating cellular phone terminal will have access to as a function of the identity of the originating cellular phone terminal.

23. The cellular phone system of claim 20, wherein when the HTTP server performs user certification in response to the receipt of the connection request.

24. A private information protection method for protecting private information related to a cellular phone terminal that can be connected to both a public wireless cellular phone network and a private wireless network, the method comprising:

(a) when the cellular phone terminal is connected to the private wireless network:

(1) activating at least one data processing function selected from the set of an address book functionality, a bookmark functionality and a mailbox functionality;

(2) downloading information from an external source, the information including one or more of:

address book information to be used in the address book functionality;

bookmark information to be used in the bookmark functionality; and electronic mail information to be used in the mailbox functionality; and (3) storing the information in the cellular phone terminal;

(b) when the cellular phone terminal is disconnected from the private wireless network:

(1) deactivating at least part of the at least one data processing function; and (2) deleting at least part of the downloaded information.

25. The method of claim 24, wherein when the cellular phone terminal is disconnected from the private wireless network, each of the date processing functions previously activated are deactivated and all of the downloaded information is deleted.

26. The method of claim 24, wherein the selection of the data processing functions activated are determined as a function of the identity of the cellular phone terminal.

27. The method of claim 24, wherein at least part of the stored information is encrypted when the cellular phone terminal is disconnected from the private wireless network and is decrypted when the cellular phone terminal is reconnected to the private wireless network.

28. The method of claim 27, wherein an encryption key is obtained from an encryption key server when the cellular phone terminal is reconnected to the private wireless network and the encryption key is used to decrypt the encrypted stored information.

29. A method for relaying calls from a cellular phone terminal adapted to connect to a public wireless cellular phone network to a destination phone terminal, the method comprising:

storing a set of telephone numbers corresponding to the cellular phone terminal remotely from the cellular phone terminal using an address book server having a call relay function to carry out the steps of:

receiving a call from the cellular phone terminal;

permitting the user of the cellular phone terminal to select a telephone number among the stored telephone numbers that the user would like to call; and in response to such selection, making a call to the destination phone terminal corresponding to the selected telephone number so as to relay the call from the cellular phone terminal to the destination phone terminal.

30. The method of claim 29, wherein the address book server responds to selection information received from the cellular phone terminal in the form of an ISDN sub-address, a DTMF signal or voice commands.

31. The method of claim 29, wherein the address book server enables or disables the call relay function as a function of information identifying the cellular phone terminal.

32. The method of claim 29, wherein the address book server enables or disables the call relay function as a function of the location of the cellular phone terminal.

33. The method of claim 29, wherein the address book server also causes separate sets of telephone numbers corresponding to each of a plurality of third party cellular phone terminals to be stored remotely from the third party cellular phone terminals, the cellular phone system further comprising an HTTP server through which calls from the cellular phone terminal, as well as calls from the third party cellular phone terminals, connect to the address book server, the HTTP server determining the identity of any of the cellular phone terminals calling the address book server and permitting the calling cellular phone terminal access to only the telephone numbers corresponding to it.

34. The method of claim 29, wherein the address book server performs user certification in response to the receipt of the call from the cellular phone terminal.

35. A method for protecting private information related to a cellular phone terminal that can be connected to both a public wireless cellular phone network and a private wireless network, the method being carried out by a private network including an address book server and an HTTP server using HTTP or HTTPS protocol, the HTTP server interfacing the address book server and an IP network connected to a public cellular phone network, the method comprising:

storing a plurality of sets of telephone numbers at the private network, each set of telephone numbers corresponding to a respective one of the cellular phone terminals;

receiving a connection request at an HTTP server via the IP network, the connection request originating from one of the cellular phone terminals; and the HTTP server denying the connection request, and therefore denying access to the address book server, if the HTTP server determines that the originating cellular phone terminal has been lost or stolen.

36. The method of claim 35, wherein the HTTP server stores information concerning which of the cellular phone terminals have been lost or stolen and looks up that information when making the determination.

37. The method of claim 35, wherein the HTTP server determines which set of telephone numbers the originating cellular phone terminal will have access to as a function of the identity of the originating cellular phone terminal.

38. The method of claim 35, wherein when the HTTP server performs user certification in response to the receipt of the connection request.

39. A method for protecting private information related to a cellular phone terminal that can be connected to both a public wireless cellular phone network and a private wireless network, the method being carried out by a private network including an bookmark server and an HTTP server using HTTP or HTTPS protocol, the HTTP server interfacing the bookmark server and an IP network connected to a public cellular phone network, the method comprising:

storing a plurality of sets of IP addresses at the private network, each set of IP addresses corresponding to a respective one of the cellular phone terminals;

receiving a connection request at an HTTP server via the IP network, the connection request originating from one of the cellular phone terminals; and the HTTP server denying the connection request, and therefore denying access to the bookmark server, if the HTTP server determines that the originating cellular phone terminal has been lost or stolen.

40. The method of claim 39, wherein the HTTP server causes information concerning which of the cellular phone terminals have been lost or stolen to be stored and looks up that information when making the determination.

41. The method of claim 39, wherein the HTTP server determines which set of IP addresses that the originating cellular phone terminal will have access to as a function of the identity of the originating cellular phone terminal.

42. The method of claim 39, wherein when the HTTP server performs user certification in response to the receipt of the connection request.

43. A method for protecting private information related to a cellular phone terminal that can be connected to both a public wireless cellular phone network and a private wireless network, the method being carried out by a private network including an mailbox server and an HTTP server using HTTP or HTTPS protocol, the HTTP server interfacing the mailbox server and an IP network connected to a public cellular phone network, the method comprising:

storing a plurality of sets of email information at the private network, each set of email information corresponding to a respective one of the cellular phone terminals;

receiving a connection request at an HTTP server via the IP network, the connection request originating from one of the cellular phone terminals; and the HTTP server denying the connection request, and therefore denying access to the mailbox server, if the HTTP server determines that the originating cellular phone terminal has been lost or stolen.

44. The method of claim 43, wherein the HTTP server causes information concerning which of the cellular phone terminals have been lost or stolen to be stored and looks up that information when making the determination.

45. The method of claim 43, wherein the HTTP server determines which of the sets of email information that the originating cellular phone terminal will have access to as a function of the identity of the originating cellular phone terminal.

46. The method of claim 43, wherein when the HTTP server performs user certification in response to the receipt of the connection request.

47. A non-transitory storage medium having a computer program stored therein, the computer program, when executed on a processor, carrying out a method for protecting private information related to a cellular phone terminal that can be connected to both a public wireless cellular phone network and a private wireless network, the method comprising:

(a) when the cellular phone terminal is connected to the private wireless network:

(1) activating at least one data processing function selected from the set of an address book functionality, a bookmark functionality and a mailbox functionality;

(2) downloading information from an external source, the information including one or more of:

address book information to be used in the address book functionality;

bookmark information to be used in the bookmark functionality; and electronic mail information to be used in the mailbox functionality; and (3) storing the information in the cellular phone terminal;

(b) when the cellular phone terminal is disconnected from the private wireless network:

(1) deactivating at least part of the at least one data processing function; and (2) deleting at least part of the downloaded information.

48. The non-transitory storage medium of claim 45, wherein when the cellular phone terminal is disconnected from the private wireless network, each of the date processing functions previously activated are deactivated and all of the downloaded information is deleted.

49. The non-transitory storage medium of claim 45, wherein the selection of the data processing functions activated are determined as a function of the identity of the cellular phone terminal.

50. The non-transitory storage medium of claim 45, wherein at least part of the stored information is encrypted when the cellular phone terminal is disconnected from the private wireless network and is decrypted when the cellular phone terminal is reconnected to the private wireless network.

51. The non-transitory storage medium of claim 48, wherein an encryption key is obtained from an encryption key server when the cellular phone terminal is reconnected to the private wireless network and the encryption key is used to decrypt the encrypted stored information.

* * * * *